(12) United States Patent
Katz et al.

(10) Patent No.: US 8,627,664 B2
(45) Date of Patent: Jan. 14, 2014

(54) METHOD AND SYSTEM FOR OPERATING A SOLAR STEAM SYSTEM

(75) Inventors: Sami Katz, Kiriat-Bialik (IL); Israel Kroizer, Jerusalem (IL)

(73) Assignee: BrightSource Industries (Israel), Ltd., Jerusalem (IL)

(*) Notice: Subject to any disclaimer, the term of this patent is extended or adjusted under 35 U.S.C. 154(b) by 448 days.

(21) Appl. No.: 12/905,789

(22) Filed: Oct. 15, 2010

(65) Prior Publication Data

US 2011/0088396 A1   Apr. 21, 2011

Related U.S. Application Data

(60) Provisional application No. 61/252,121, filed on Oct. 15, 2009.

(51) Int. Cl.
*F03G 6/00* (2006.01)

(52) U.S. Cl.
USPC ............ 60/641.8; 60/641.11; 60/641.13; 60/641.14; 60/641.15

(58) Field of Classification Search
USPC ............ 60/641.8, 641.11–641.15, 653, 60/677–679, 663, 666; 126/585, 593, 595, 126/601
See application file for complete search history.

(56) References Cited

U.S. PATENT DOCUMENTS

| | | |
|---|---|---|
| 811,274 A | 1/1906 | Carter |
| 2,999,943 A | 9/1961 | Willard |
| 3,892,433 A | 7/1975 | Blake |
| 3,924,604 A | 12/1975 | Anderson |
| 4,034,735 A | 7/1977 | Waldrip |
| 4,044,753 A | 8/1977 | Fletcher et al. |
| 4,102,326 A | 7/1978 | Sommer |
| 4,117,682 A | 10/1978 | Smith |
| 4,146,785 A | 3/1979 | Neale |
| 4,172,443 A | 10/1979 | Sommer |
| 4,219,729 A | 8/1980 | Smith |
| 4,227,513 A | 10/1980 | Blake et al. |

(Continued)

FOREIGN PATENT DOCUMENTS

| | | |
|---|---|---|
| DE | 10248068 | 5/2004 |
| EP | 0106688 | 3/1985 |

(Continued)

OTHER PUBLICATIONS

Lopez-Martinez et al., "Vision-based system for the safe operation of a solar power tower plant," Iberamia, 2002, LNAI 2527: pp. 943-952.*

(Continued)

*Primary Examiner* — Thomas Denion
*Assistant Examiner* — Philip Eklem
(74) *Attorney, Agent, or Firm* — Miles & Stockbridge P.C.; Mark A. Catan

(57) ABSTRACT

Methods, apparatus and systems for operating a solar steam system in response to a detected or predicted reduced or impending reduced insolation event are disclosed herein. Examples of transient reduced insolation events include but are not limited to cloud-induced reduction in insolation, dust-induced reduction in insolation, and insolation events caused by solar eclipses. In some embodiments, in response to the detecting or predicting, steam flow is regulated within the solar steam system to reduce a flow rate into a steam turbine. Alternatively or additionally, one or more heliostats may be responsively redirected onto a steam superheater or steam re-heater.

3 Claims, 33 Drawing Sheets

(56) References Cited

U.S. PATENT DOCUMENTS

| | | | |
|---|---|---|---|
| 4,245,618 A | 1/1981 | Wiener | |
| 4,247,182 A | 1/1981 | Smith | |
| 4,265,223 A | 5/1981 | Miserlis et al. | |
| 4,283,887 A | 8/1981 | Horton et al. | |
| 4,289,114 A | 9/1981 | Zadiraka | |
| 4,297,521 A | 10/1981 | Johnson | |
| 4,320,663 A * | 3/1982 | Francia | 60/667 |
| 4,331,829 A | 5/1982 | Palazzetti et al. | |
| 4,343,182 A | 8/1982 | Pompei | |
| 4,365,618 A | 12/1982 | Jones | |
| 4,438,630 A | 3/1984 | Rowe | |
| 4,459,972 A | 7/1984 | Moore | |
| 4,474,169 A | 10/1984 | Steutermann | |
| 4,476,853 A * | 10/1984 | Arbogast | 126/578 |
| 4,485,803 A | 12/1984 | Wiener | |
| 4,490,981 A | 1/1985 | Meckler | |
| 4,512,336 A | 4/1985 | Wiener | |
| 4,564,275 A | 1/1986 | Stone | |
| 4,633,854 A | 1/1987 | Mayrhofer | |
| 4,665,706 A * | 5/1987 | Russell et al. | 60/646 |
| 4,913,129 A | 4/1990 | Kelly et al. | |
| 4,979,493 A * | 12/1990 | Seidel | 126/593 |
| 5,128,799 A | 7/1992 | Byker | |
| 5,417,052 A | 5/1995 | Bharathan et al. | |
| 5,578,140 A | 11/1996 | Yogev et al. | |
| 5,759,251 A | 6/1998 | Nakamura et al. | |
| 5,861,947 A | 1/1999 | Neumann | |
| 5,862,799 A | 1/1999 | Yogev et al. | |
| 5,899,199 A | 5/1999 | Mills | |
| 5,905,590 A | 5/1999 | Van Der Sluis et al. | |
| 5,982,481 A | 11/1999 | Stone et al. | |
| 6,080,927 A | 6/2000 | Johnson | |
| 6,131,565 A | 10/2000 | Mills | |
| 6,310,725 B1 | 10/2001 | Duine et al. | |
| 6,597,709 B1 | 7/2003 | Diver, Jr. | |
| 6,653,551 B2 | 11/2003 | Chen | |
| 6,662,801 B2 | 12/2003 | Hayden et al. | |
| 6,818,818 B2 | 11/2004 | Bareis | |
| 6,899,097 B1 | 5/2005 | Mecham | |
| 6,926,440 B2 | 8/2005 | Litwin | |
| 6,957,536 B2 | 10/2005 | Litwin et al. | |
| 6,959,993 B2 | 11/2005 | Gross et al. | |
| 7,042,615 B2 | 5/2006 | Richardson | |
| 7,191,597 B2 | 3/2007 | Goldman | |
| 7,191,736 B2 | 3/2007 | Goldman | |
| 7,207,327 B2 | 4/2007 | Litwin et al. | |
| 7,296,410 B2 | 11/2007 | Litwin | |
| 7,331,178 B2 | 2/2008 | Goldman | |
| 7,340,899 B1 | 3/2008 | Rubak et al. | |
| 7,523,921 B2 | 4/2009 | Garrity | |
| 7,884,279 B2 | 2/2011 | Dold et al. | |
| 8,001,960 B2 | 8/2011 | Gilon et al. | |
| 8,033,110 B2 | 10/2011 | Gilon et al. | |
| 2004/0086021 A1 | 5/2004 | Litwin | |
| 2004/0231716 A1 | 11/2004 | Litwin | |
| 2005/0126170 A1 | 6/2005 | Litwin | |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2007/0272234 A1 | 11/2007 | Allen et al. | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0029150 A1* | 2/2008 | Quero et al. | 136/248 |
| 2008/0293132 A1 | 11/2008 | Goldman et al. | |
| 2008/0295883 A1 | 12/2008 | Ducellier et al. | |
| 2008/0314438 A1 | 12/2008 | Tran et al. | |
| 2009/0038608 A1 | 2/2009 | Caldwell | |
| 2009/0056701 A1 | 3/2009 | Mills et al. | |
| 2009/0107485 A1 | 4/2009 | Reznik et al. | |
| 2009/0151769 A1 | 6/2009 | Corbin et al. | |
| 2009/0178668 A1 | 7/2009 | Boggavarapu | |
| 2009/0217921 A1 | 9/2009 | Gilon et al. | |
| 2009/0229264 A1 | 9/2009 | Gilon et al. | |
| 2009/0250052 A1 | 10/2009 | Gilon et al. | |
| 2010/0006087 A1 | 1/2010 | Gilon et al. | |
| 2010/0139644 A1 | 6/2010 | Schwarzbach et al. | |
| 2010/0191378 A1 | 7/2010 | Gilon et al. | |
| 2010/0236239 A1 | 9/2010 | Kroizer et al. | |
| 2010/0263709 A1 | 10/2010 | Norman et al. | |
| 2010/0282242 A1 | 11/2010 | Gilon et al. | |
| 2010/0300510 A1 | 12/2010 | Goldman et al. | |
| 2011/0036343 A1 | 2/2011 | Kroyzer et al. | |
| 2011/0220091 A1 | 9/2011 | Kroyzer | |
| 2012/0024282 A1 | 2/2012 | Gilon et al. | |

FOREIGN PATENT DOCUMENTS

| | | |
|---|---|---|
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011/140021 | 11/2011 |
| WO | WO 2012/014153 | 2/2012 |

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1): pp. 94-101.

Rabl, A., "Tower Reflector for Solar Power Plan," *Solar Energy*, 1976, 18: pp. 269-271.

Roschke, E.J., "Wind Loading on Solar Concentrators: Some General Considerations," Jet Propulsion Laboratory, National Aeronautics and Space Administration, U.S. Department of Energy [online],

(56) References Cited

OTHER PUBLICATIONS

May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Stone, K.W., and Jones, S.A., "Analysis of Solar Two Heliostat Tracking Error Sources," Sandia National Laboratories, Report No. SAND99-0239C, Jan. 28, 1999.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

Vant-Hull, L.L., and Pitman, C.L., "Static and Dynamic Response of a Heliostat Field to Flux Density Limitations on a Central Receiver," *Solar Engineering*, 1990, pp. 31-38.

\* cited by examiner

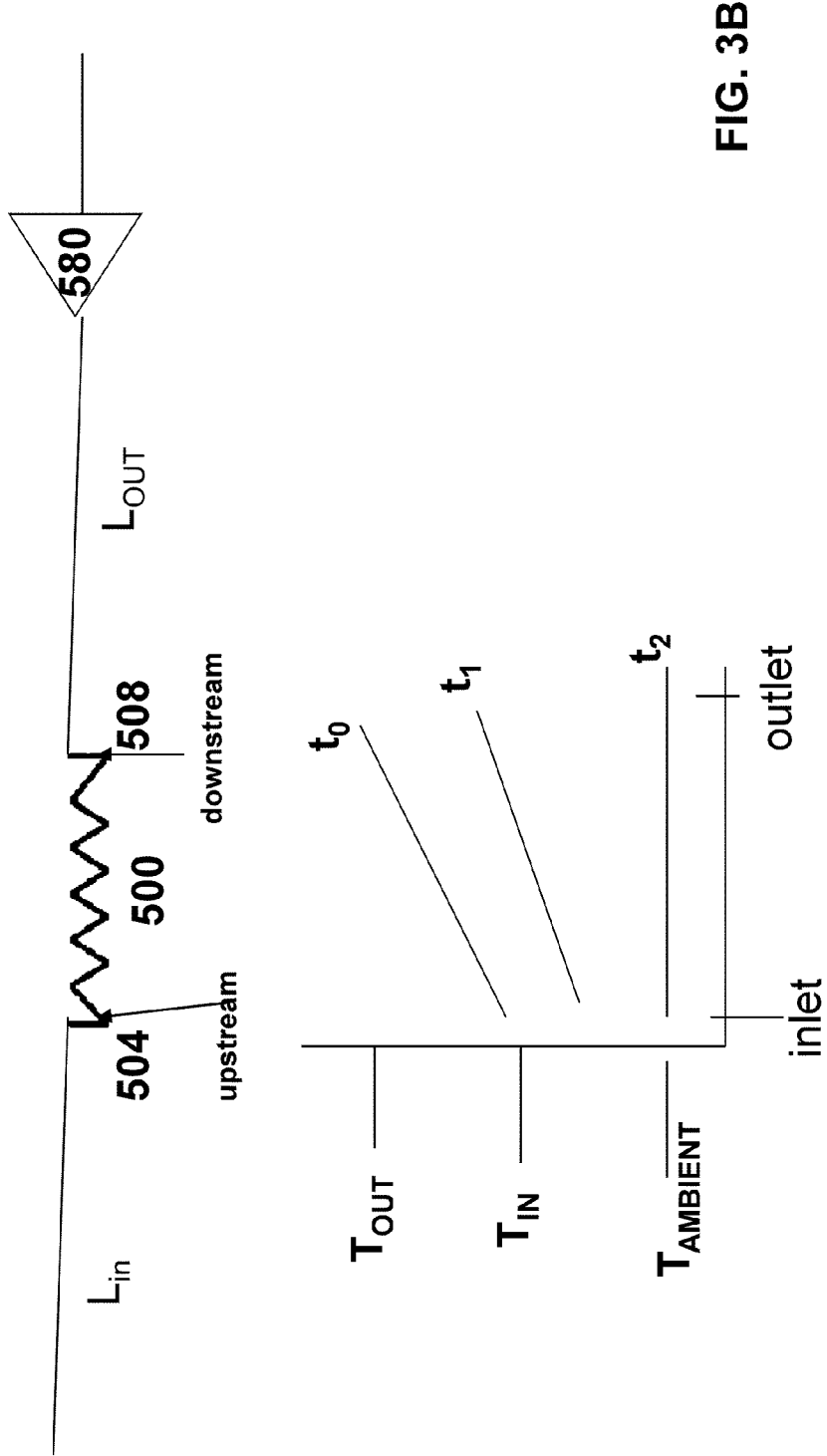

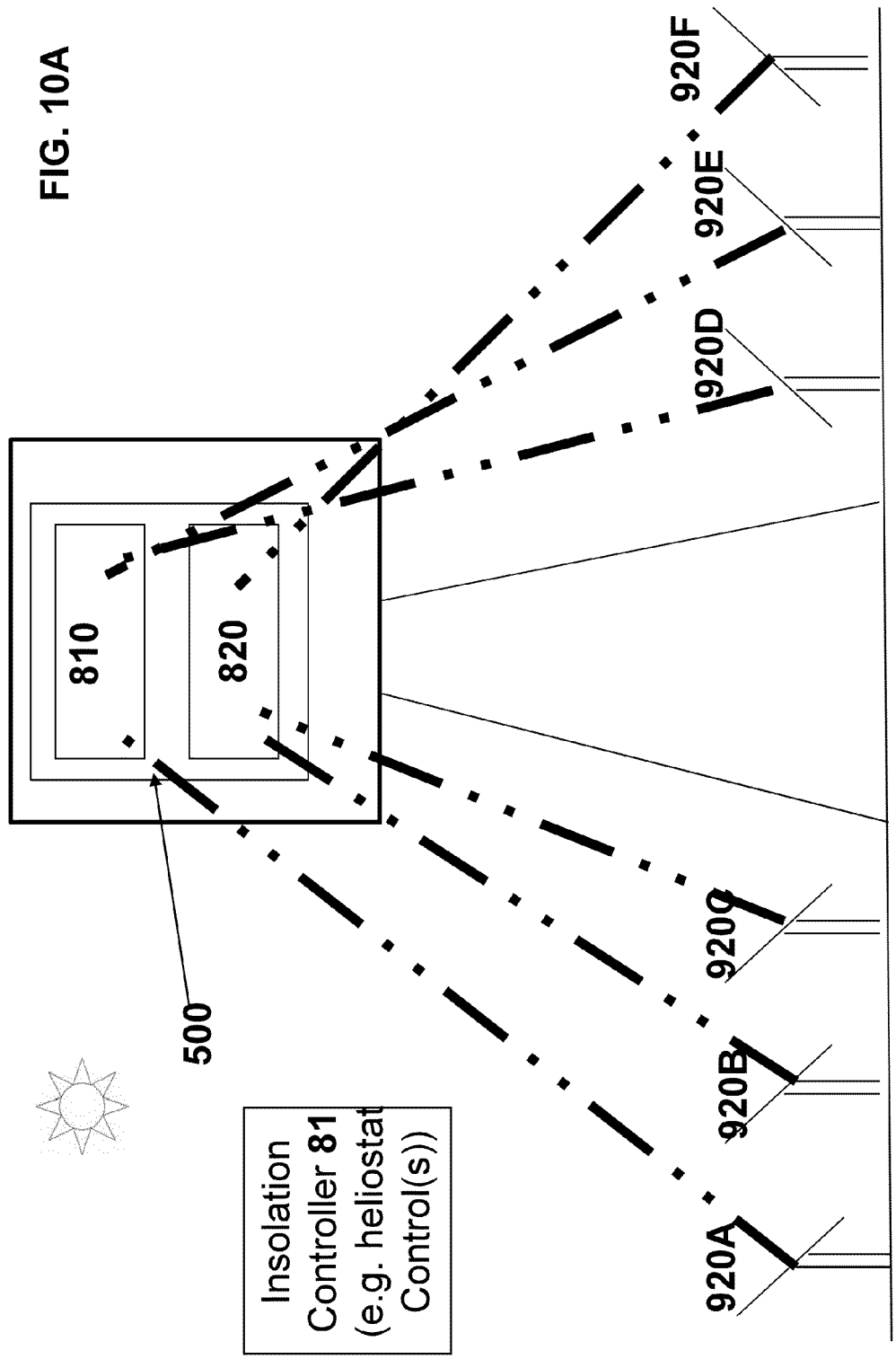

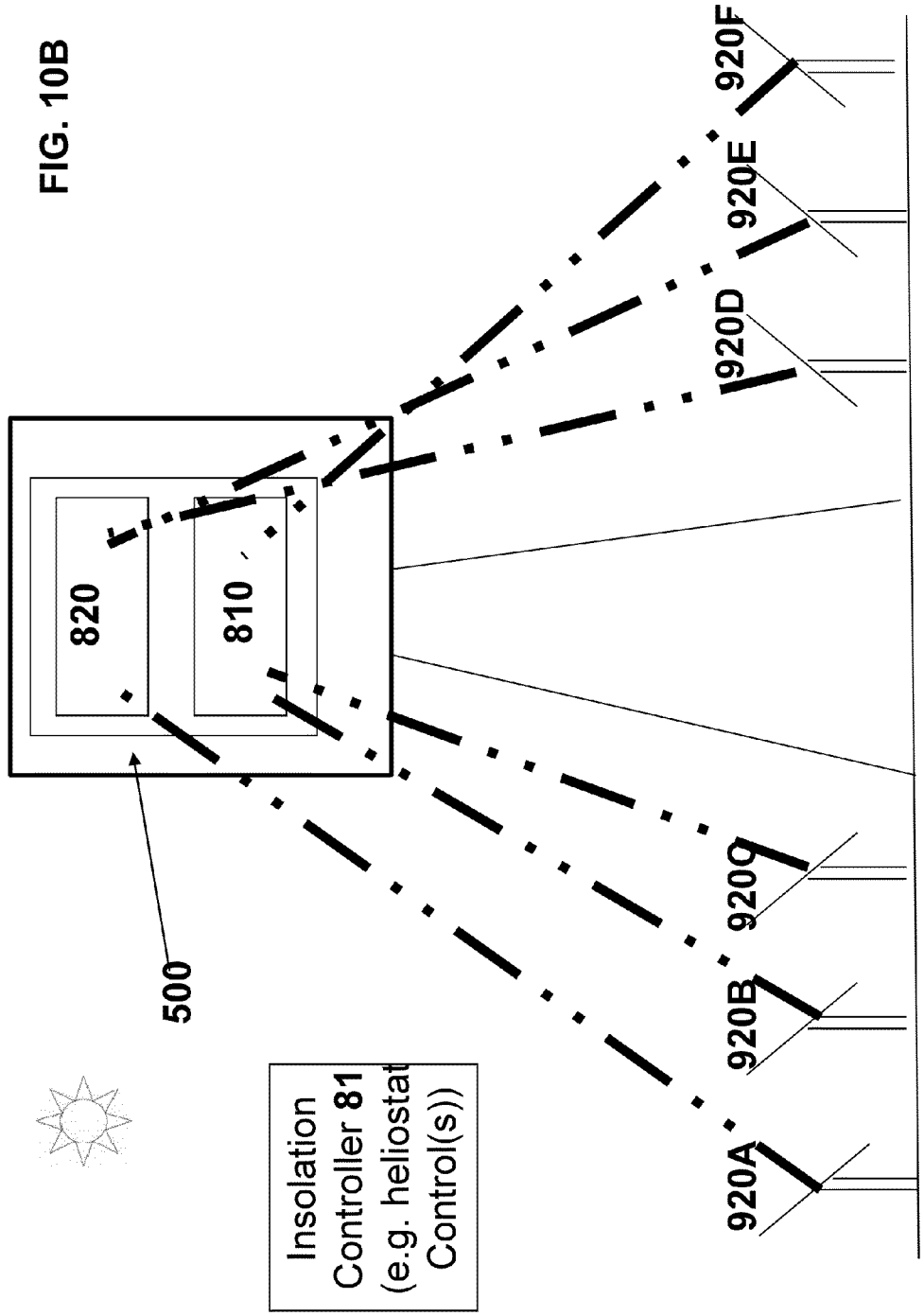

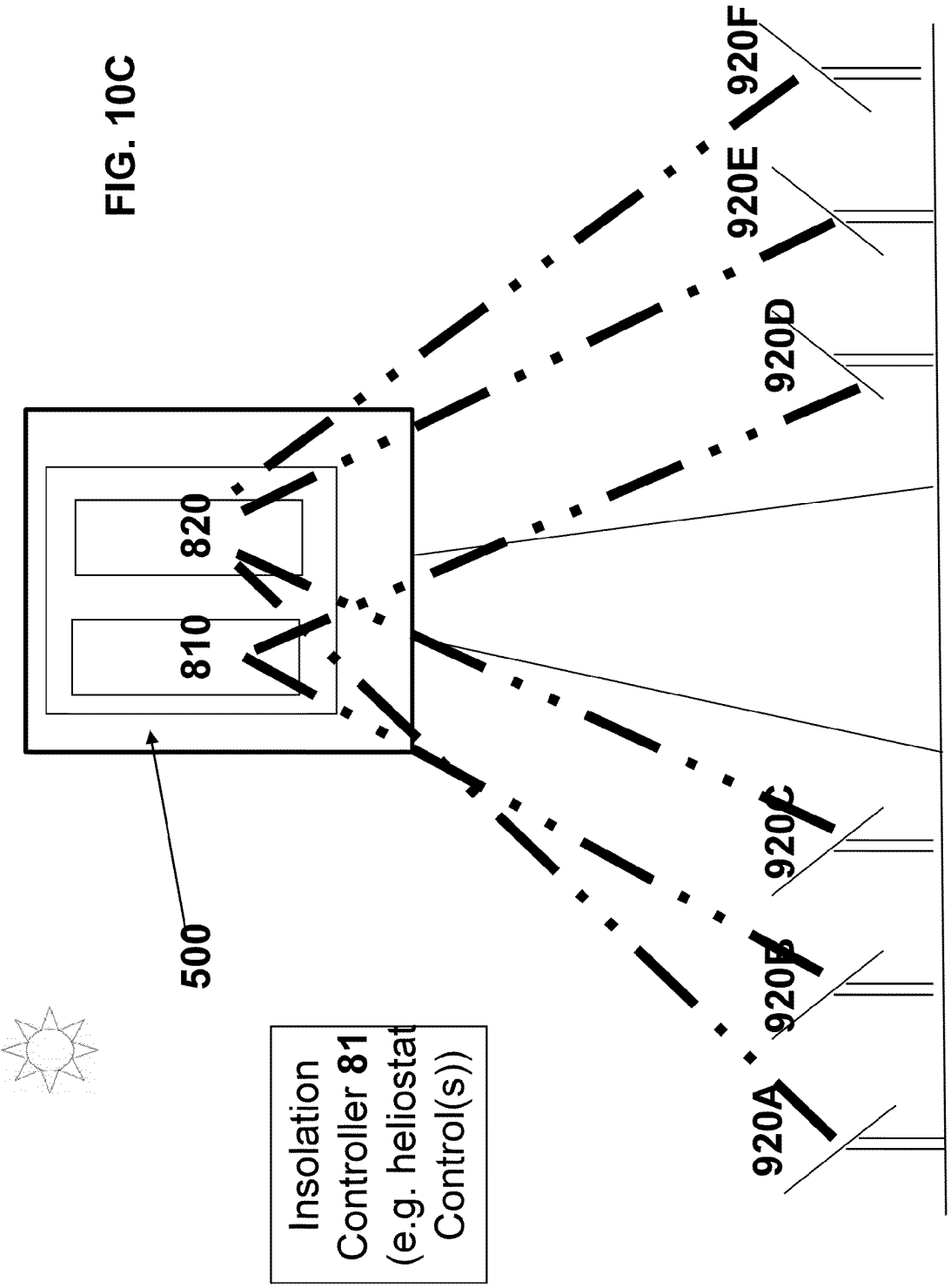

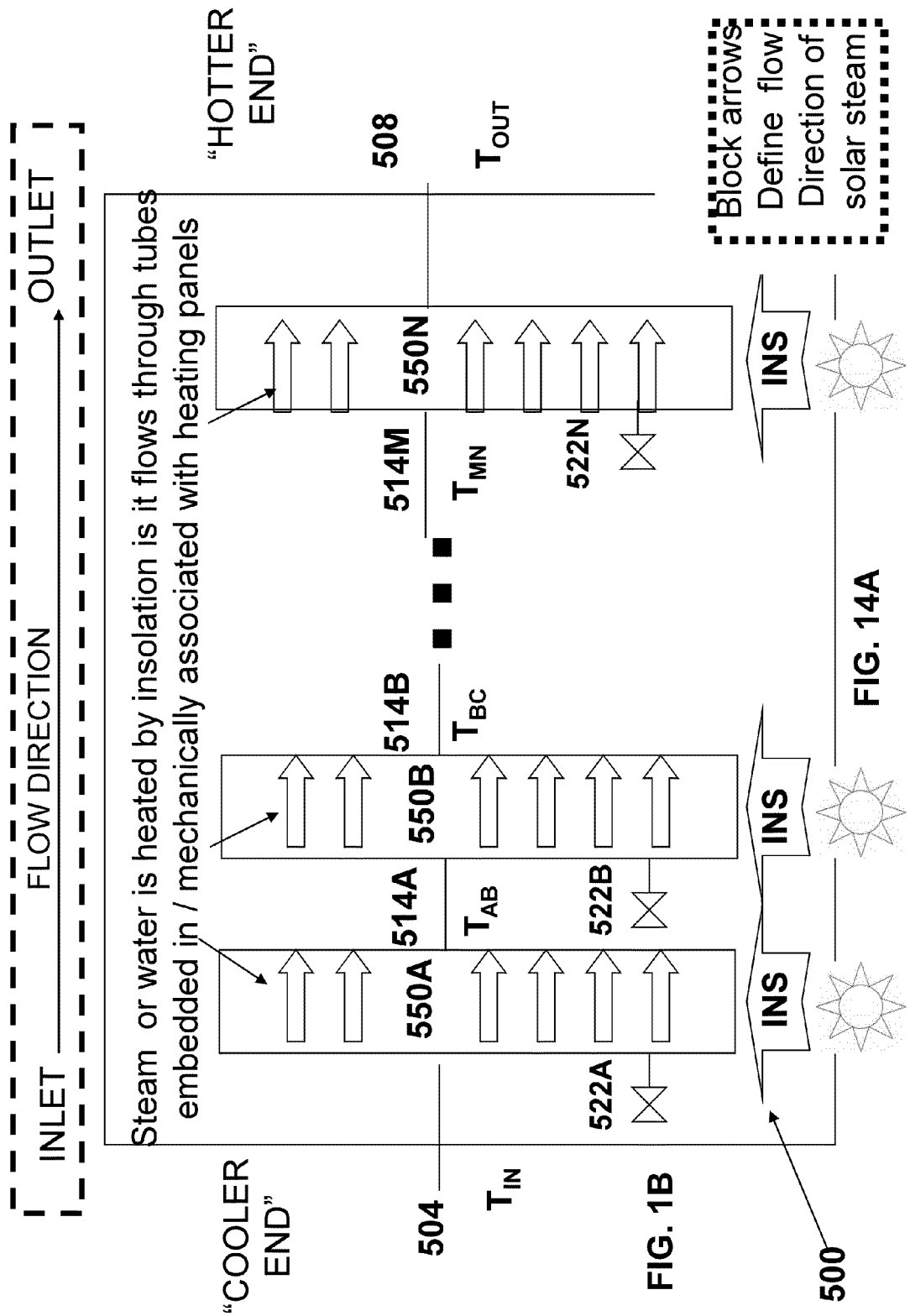

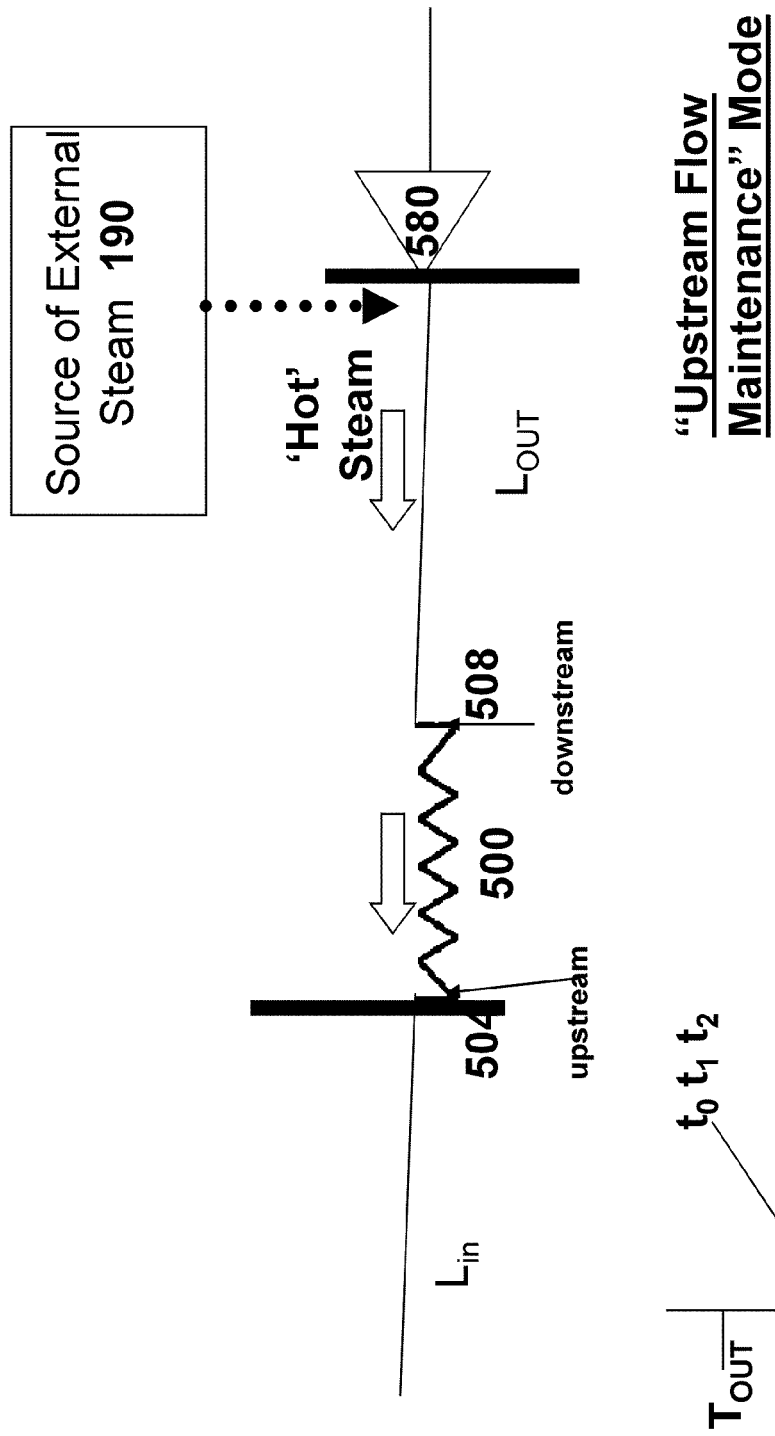

METHOD AND SYSTEM FOR OPERATING A SOLAR STEAM SYSTEM

CROSS-REFERENCE TO RELATED APPLICATIONS

The present application claims the benefit of U.S. Provisional Application No. 61/252,121, filed Oct. 15, 2009, which is hereby incorporated by reference herein in its entirety.

FIELD

The present disclosure relates generally to solar steam systems, and, more particularly, to methods and systems for operating a solar steam system in response to detected or predicted insolation conditions.

SUMMARY

Embodiments of the present disclosure relate to techniques and apparatus for operating a solar steam system responsively to detected and/or predicted changes in insolation conditions. Techniques disclosed herein may be applied to a transient or temporary reduction in insolation due to any factor, or combination of factors is detected or predicted, even if the prediction ultimately turns out to be false. Factors that may cause a temporary reduction in insolation include, but are not limited to, cloud coverage, an increased presence of dust, a temporarily dysfunctional heliostat and solar eclipses.

The term 'transient reduction' in insolation relates to events that occur during the day where there is a possibility that the level of insolation will recover during the same day. This is in contrast to reduced insolation levels that occur at the end of the day as sunset approached.

In response to a current or impending transient reduction in insolation (e.g., due to cloud cover), it is possible to reduce the production of work in a steam turbine that receives superheated or reheated steam from a solar receiver and/or to reduce a flow of steam into the solar receiver so that the flow rate of steam in the solar receiver is reduced. As noted above, the reduction in work may occur even in the case of a predicted impending reduction in insolation which ultimately does not occur.

By reducing the flow of steam in the solar receiver (e.g., a solar steam superheater or a solar steam reheater), it is possible to retard and/or eliminate any cooling (loss of enthalpy caused by convection and/or radiation) that may take place within the solar receiver during the transient 'low insolation' or 'no insolation' time periods. At a later time after the conclusion of the 'low insolation' conditions (or a 'warning' or 'prediction' of low insolation conditions—or a 'candidate' low insolation condition which turns out to be only extremely brief), when an amount of available insolation for heating water and/or steam once again increases, the steam flow rate to or through the solar receiver may also be increased.

It is noted that the reduction of the flow of steam into or through the solar superheater and/or reheater reduces the rate at which the temperature (or pressure) drops within the solar superheater and/or reheater and within the steam turbine during the transient low insolation time period. Even though it may be necessary to forgo the opportunity to generate electricity during the low insolation time period (or to generate power at a rate that is less than the maximum rate possible even according to constraints imposed by the low insolation conditions), the enthalpy conservation within the solar superheater and/or re-heater that results by the flow rate reduction is useful at a later time when the low-insolation conditions conclude and the amount of available insolation increases (for example, after the clouds pass).

Optionally, and in some embodiments preferably, external steam is introduced into the solar receiver (i.e., superheater or reheater) in response to the detecting or predicting of the reduction in insolation.

In some embodiments, the turbine includes or is associated with an inlet flow controller (e.g., having one or more valves that can that can be partially or completely closed) configured to regulate the rate at which steam flows into the turbine. By causing the turbine inlet flow controller to reduce the input flow rate into the turbine (for example, by partially closing one or more valves) it is possible to concomitantly reduce the rate of a flow of steam into the turbine(s) and/or into the solar steam superheater (or reheater) and/or out of the steam superheater (or reheater) and/or out of a steam separator (e.g., a steam separation drum).

The rate of steam flow during a single day can be repeatedly reduced or increased in response to ambient cloud conditions. For example, in the event that clouds are detected or predicted, the intensity and/or endurance of the 'candidate cloud event' (i.e., the 'severity of the candidate cloud event) may not be accurately known a priori. In this situation, it is possible to reduce the flow rate (e.g., by employing the turbine inlet flow controller)—for example, to immediately reduce the flow rate (e.g., within a matter of minutes).

In the event that additional information indicates that the candidate cloud event is relatively 'severe,' it may be advantageous to maintain the reduced flow rate or even to reduce it further. Conversely, in the event that additional information indicates otherwise, the flow rate can be increased accordingly—for example, immediately increased within a matter of minutes.

A method of controlling a solar steam system comprising a steam turbine and one or more solar receivers selected from the group consisting of a solar steam superheater and a solar steam reheater is disclosed. The method includes (a) detecting or predicting a current or impending transient reduced-insolation event, and, (b) in response to the detecting or predicting, regulating a flow of steam in the solar steam system so that the flow of steam through the solar superheater and/or solar reheater into the steam turbine is reduced.

In some embodiments, the current or impending transient insolation reduction event is one of a cloud-induced reduced insolation event and a dust-induced reduction insolation event.

In some embodiments, the detecting or predicting includes at least one of analyzing digital images of a scene including one or more clouds, measuring a level of dust present in the air using a laser, and measuring a level of solar flux incident upon one or more of the solar receivers.

In some embodiments, the method can further include, (c) in response to an additional insolation level detection or prediction that occurs at a later time after the input flow rate of steam has been reduced, regulating the flow of steam in the steam system so that the flow rate into the turbine increases to a previous level that prevailed before the regulating in (b).

In some embodiments, the amount of flow reduction into the steam turbine is equal to at least 15% of the maximum flow rate of steam allowed into the steam turbine, and (b) and (c) are completed within a period of time that is less than 20 minutes.

In some embodiments, the regulating of the flow of steam is carried out to reduce an input flow rate of steam into the steam turbine by an amount that is at least 10% (or at least 15% or at least 20% or at least 30%) of the maximum flow rate of steam allowed into the steam turbine within a time period that is less than 20 minutes (or less than 15 minutes or less than 10 minutes or less than 5 minutes).

In some embodiments, the reduction of the input flow rate of steam is carried out so that the pressure within the turbine remains substantially constant as the input flow rate of steam flow is reduced.

In some embodiments, the method further includes (c) in response to an additional insolation level detection or prediction that occurs at a later time after the input flow rate of steam has been reduced in (b), regulating the flow of steam in the steam system so that the flow rate into the turbine increases to a previous level that prevailed before the regulating in (b) such that the pressure within the turbine remains substantially constant as the flow rate of steam into the turbine is increased.

In some embodiments, the flow reduction is carried out by means of a turbine inlet controller.

In some embodiments, the solar steam system can include a steam separation vessel that feeds steam to the turbine via the solar steam receiver, and wherein the flow regulation is carried out by means of a valve located at an outlet of the steam separation vessel.

A solar steam system for generating useful work from solar radiation is disclosed. The system can include (a) one or more solar receivers selected from the group consisting of a solar steam superheater and a solar steam reheater, the solar receiver(s) configured to heat steam received therein with insolation so that an outlet temperature of the solar receiver exceeds an inlet temperature; (b) a steam turbine configured to receive the insolation-heated steam from the solar receiver; and (c) a flow controller configured to regulate the flow of steam in one or more locations within the solar steam system, the flow controller configured to respond to a control signal indicating a current or impending transient reduced-insolation event by regulating a flow of steam so as to reduce a flow of steam through the solar receiver into the steam turbine.

In some embodiments, the system can further include (e) electronic circuitry configured to analyze data descriptive of prevailing or historical weather conditions and to effect the detection or prediction according to results of the analysis.

In some embodiments, the electronic circuitry includes one or more of analog electronics, digital electronics and computer-executable code.

In embodiments, a method of operating a solar receiver can include: (a) when insolation is available, causing a fluid to flow through the solar receiver in a first direction so that the fluid is heated within the solar receiver by insolation; (b) detecting a current or impending reduced-insolation event; and (c) in response to the detected reduced-insolation event, causing external steam to flow within the solar receiver in a second direction that is opposite to the first direction.

The fluid may be superheated steam.

In embodiments, a solar thermal system can include a plurality of heliostats, a first sub-system, and a second sub-system, the first sub-system comprising a re-circulating boiler loop where $H_2O$ flows between a solar evaporator and a steam separator such that steam generated by the solar evaporator is received into the steam separator and liquid-phase $H_2O$ is sent back to the solar evaporator, the second sub-system comprising a solar superheater and a turbine where steam from the steam separator of the first sub-system flows to the turbine via the solar superheater of the second sub-system where it is superheated. A method of controlling the solar thermal system can include: detecting or predicting a current or impending transient reduced insolation event; and responsively to the detecting or predicting, effecting the following: a) regulating fluid flow to reduce a flow of enthalpy from the first sub-system into the second sub-system, thereby conserving enthalpy in the first sub-system; b) re-aiming heliostats to re-allocate available insolation to increase a fraction of total available insolation directed to the second sub-system at the expense of insolation directed to the first sub-system.

Objects and advantages of embodiments of the present disclosure will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIGS. 3A-3B illustrate the cooling of a solar receiver.

DETAILED DESCRIPTION

Figure 1A:
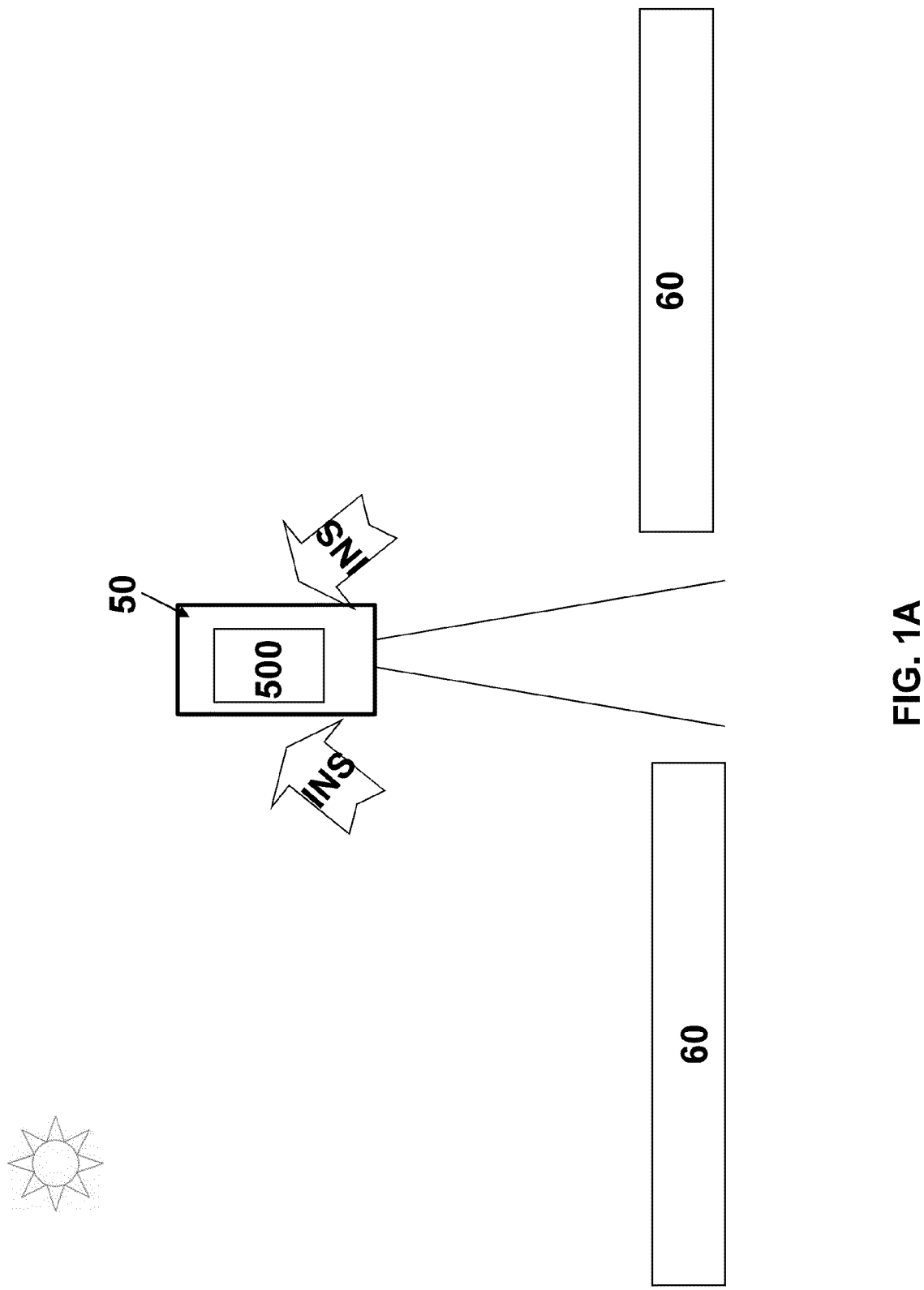
FIG. 1A-1C illustrate solar tower systems for generating solar steam.
Figure 1B:
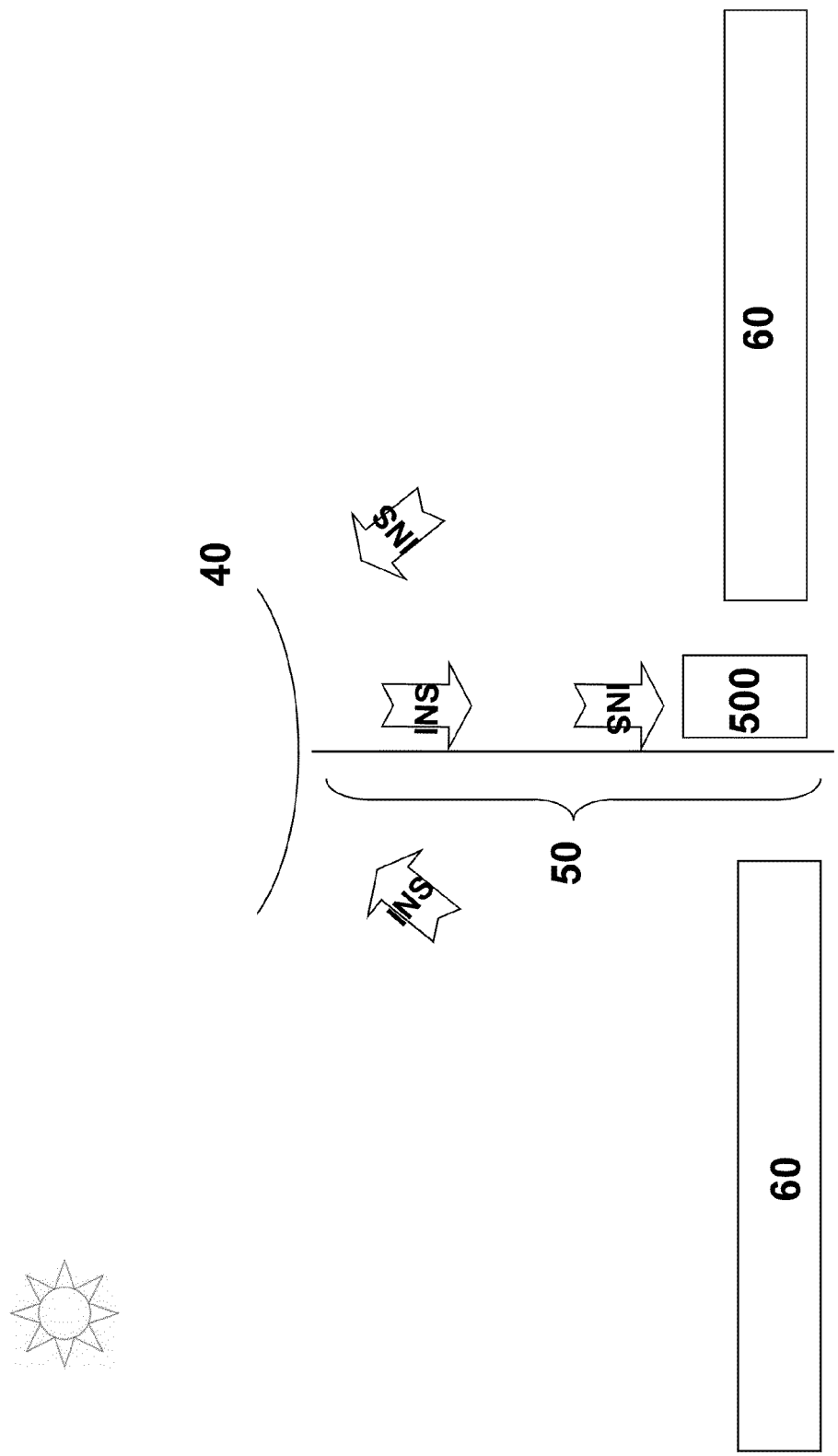

FIG. 1A-1B are illustrations of solar tower systems for generating solar steam. The system includes a solar tower 50, which receives reflected focused sunlight from a plurality 60 of heliostats. Mounted on the solar tower 50 is a solar steam system 500 including a plurality of solar receivers. Each solar receiver is configured to heat water and/or steam and/or supercritical steam using insolation received from the heliostats. In different examples, solar tower 50 may be at least 25 meters, at least 50 meters, at least 75 meters, or even higher.

In the example of FIG. 1A, the solar steam system 500 is mounted at or near the top of tower 50. In the example of FIG. 1B, secondary reflector 40 is mounted at or near the top of tower 50. In the example of FIG. 1B, secondary reflector 40 receives insolation from the heliostats 60 and reflects the insolation downward to solar steam system 500 including the receivers.

Figure 1C:
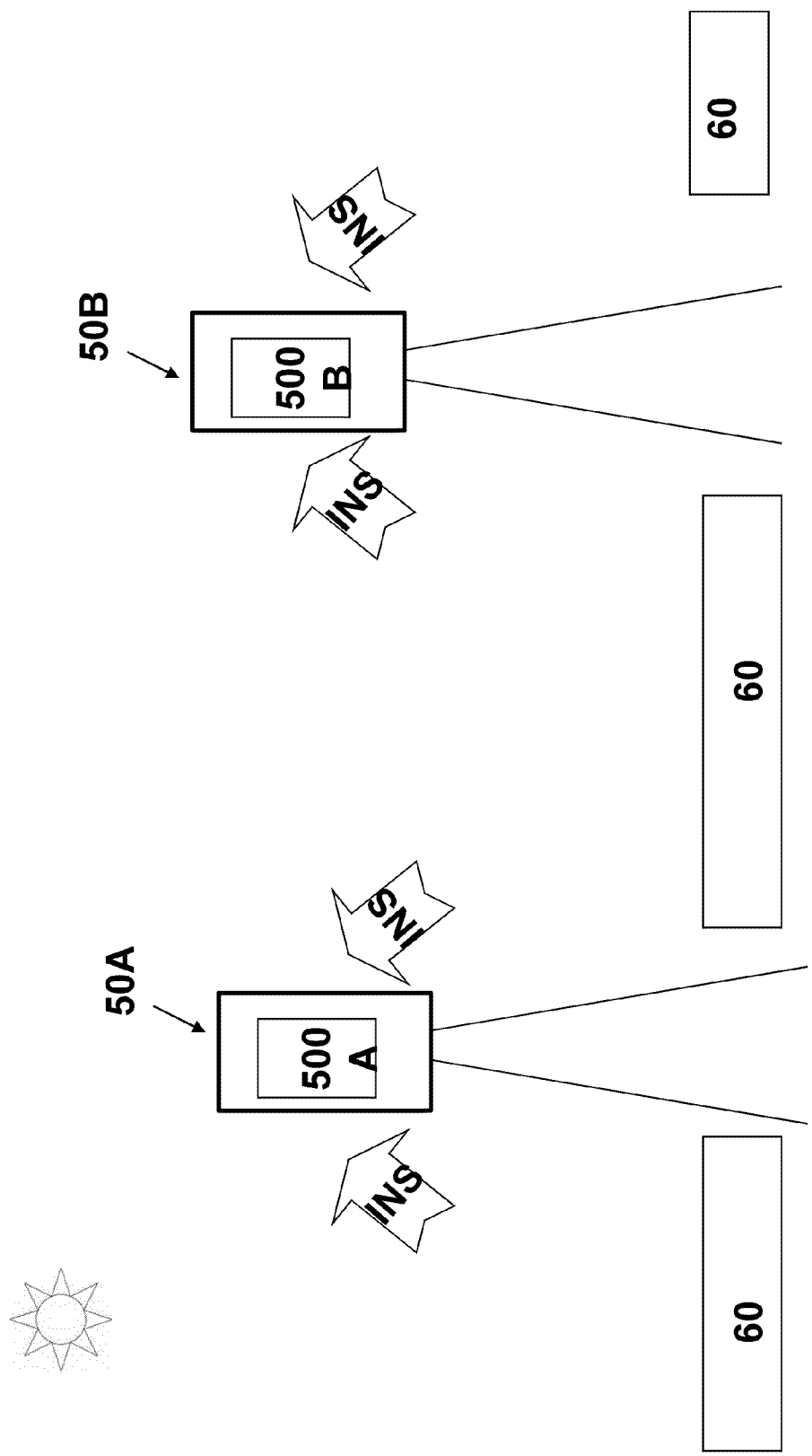

In the example of FIG. 1C, there are multiple (i.e. two or more than two) solar towers 50, each tower being associated with a respective solar steam system 500. At any given time, a given heliostat may be directed to a solar receiver of any one of the towers. Throughout the figures, "INS" is an abbreviation for 'insolation.'

Figure 2:
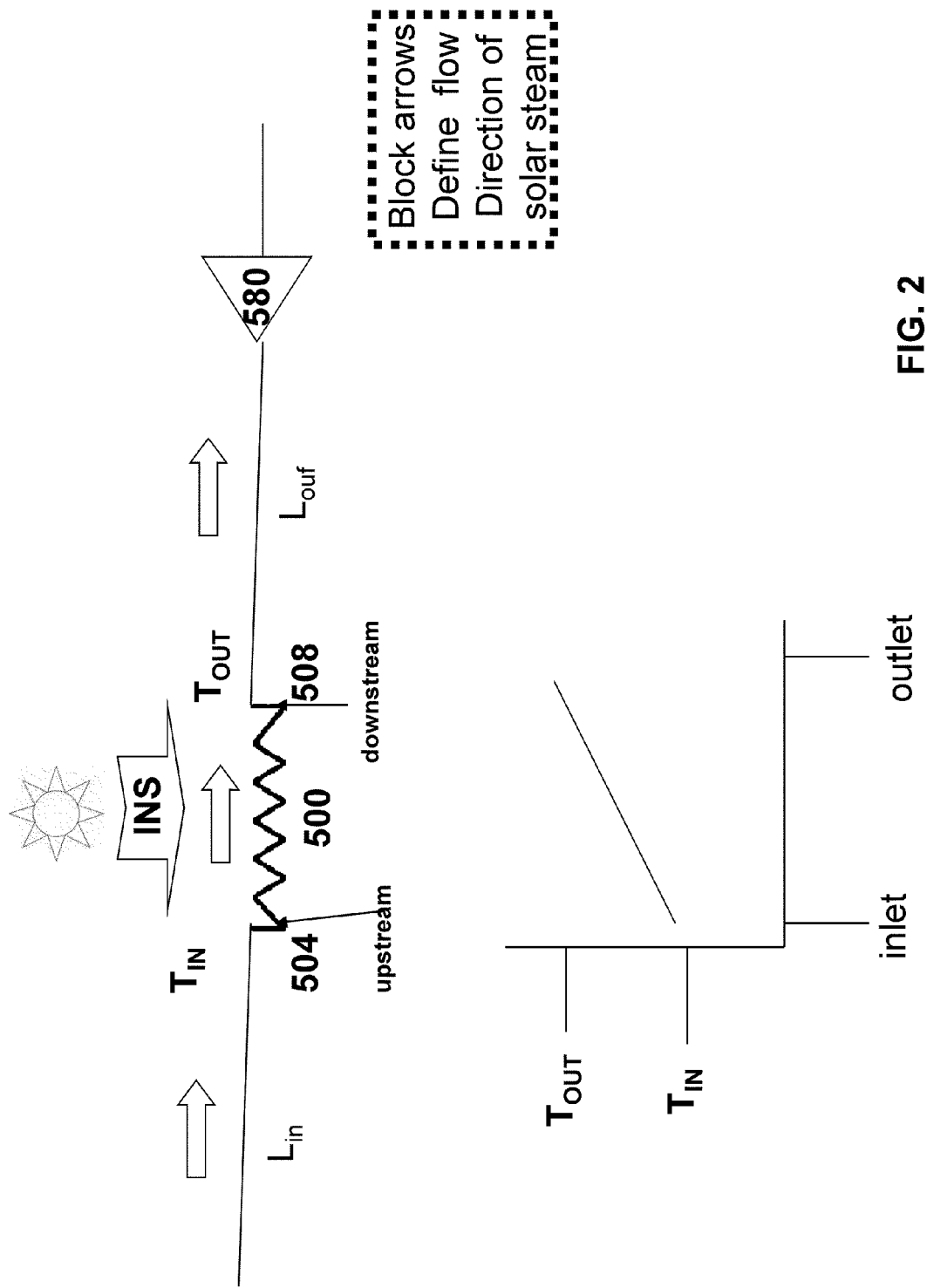
FIG. 2 illustrates a solar steam system where superheated steam flows from a solar receiver to a turbine.

FIG. 2 is a block diagram of a solar steam system for carrying out useful work by a turbine, for example, to generate electricity. The system includes a solar receiver (i.e. boiler and/or superheater and/or reheater and/or supercritical steam generator) where concentrated solar radiation (or insolation)

heats a working fluid. In the configuration of FIG. 2, water and/or steam (at a temperature of $T_{in}$) enters the solar receiver 500 via inlet 504 and line $L_{in}$, and steam (at a temperature of $T_{out}$) leaves the solar receiver 500 via outlet 508 and line $L_{out}$.

Because the solar receiver receives concentrated insolation (indicated by INS in the figure), the enthalpy in the steam leaving the solar receiver 500 (having a temperature indicated in FIG. 2 as $T_{out}$), exceeds that at which steam and/or water, including the temperature represented as $T_{in}$, enters the solar receiver 500. For example, representative temperature difference ($T_{out}-T_{in}$) may be 30 or 50 or 70 or 100 or 150 or 200 degrees Celsius.

The heated steam flows to turbine 580 (e.g., single stage or multiple stage) where electricity is generated. As is seen from FIG. 2, the steam flows in a defined direction within steam line $L_{in}$ (illustrated by the block arrows), the solar boiler system itself, and within steam line $L_{out}$. This defined direction is towards the turbine 580 and is indicated by the block arrows.

As is indicated by the graph at the bottom of FIG. 2, wherein the horizontal axis represents linear distance along a fluid path within the solar boiler, and the vertical axis represents steam temperature, there is typically some temperature profile along the length of the solar boiler. It is appreciated that the linear profile illustrated is just one non-limiting example, and different embodiments will be characterized by respective (different) temperature profiles.

Figure 3A:
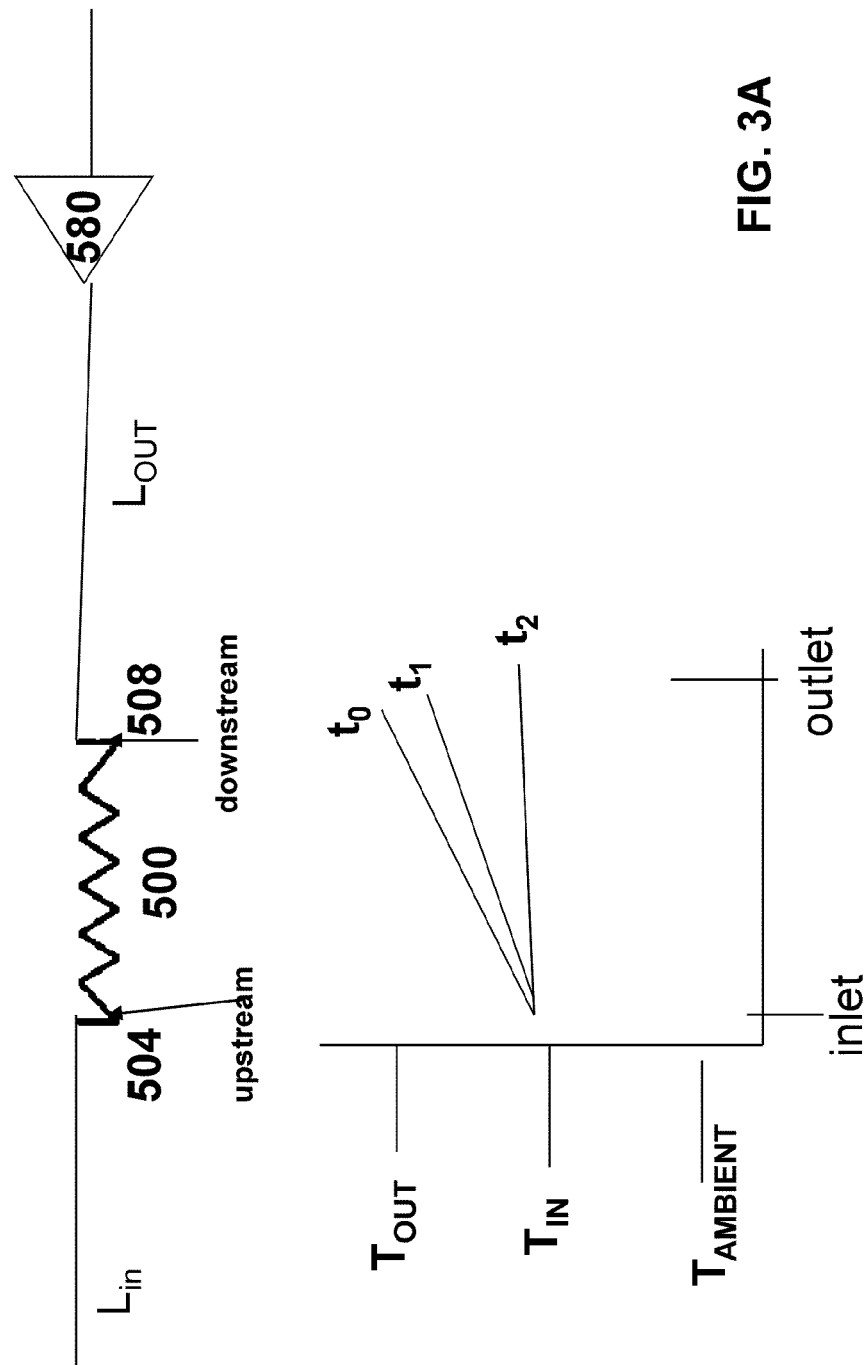

Insolation is variable both predictably (diurnal variation) and unpredictably, due to cloud cover, dust, solar eclipses, or other reasons. FIGS. 3A-3B illustrate effects on the temperature profile within a solar boiler as a function of time (where $t_1$ is at a later time than $t_0$; $t_2$ is at a later time than $t_1$) during a temporary lapse in insolation. The solar boiler and the steam within progressively cools. For example, depending on boiler configuration, materials and insulation, as well as ambient weather conditions (as shown in FIG. 3A), the steam in the solar boiler may gradually tend to reach more or less a uniform temperature, which may be at or below the normal-mode inlet temperature, or (as shown in FIG. 3B) as low as the ambient temperature. Other cooling scenarios other than those illustrated in FIGS. 3A-3B are possible.

Some embodiments of the present invention relate to methods and apparatus whereby in response to a predicted or detected temporary reduction in available insolation, one or more operations that are potentially useful for preserving a thermal gradient across a solar receiver (for example, a steam superheater or a steam reheater) are carried out. These operation(s) may also be useful for maintaining a temperature within and/or conserving enthalpy within the solar receiver and/or in a steam separation vessel which 'feeds' the solar receiver and the turbine and/or within the turbine itself.

The temporary reduction in available insolation may be attributed to any of a number of causes, including but not limited to, clouds, dust, temporary technical problems of one or more heliostats, or any other reason.

Examples of operations that, in different embodiments, are carried out in response to the predicted or detected temporary reduction in available insolation include, but are not limited to, reducing the flow of steam into or through a solar-steam-powered turbine (or into or through a solar steam super-heater or reheater), maintaining the pressure within the steam-power turbine, reducing the flow out of a steam separation drum, and re-aiming heliostats from one solar receiver (e.g., a solar evaporator) to another solar receiver (e.g., a solar superheater or reheater).

In various embodiments, one or more of these presently disclosed operations is carried out at least in part by operating a flow control system 842 (see FIGS. 5-6, 11-12) and/or heliostat control system 81 (see FIGS. 9-10) to control flow rates and/or to control pressures and/or to control heliostat aiming and/or to control use of external steam and/or to control any other operating parameter of a solar steam system for generating electricity.

Figure 4:
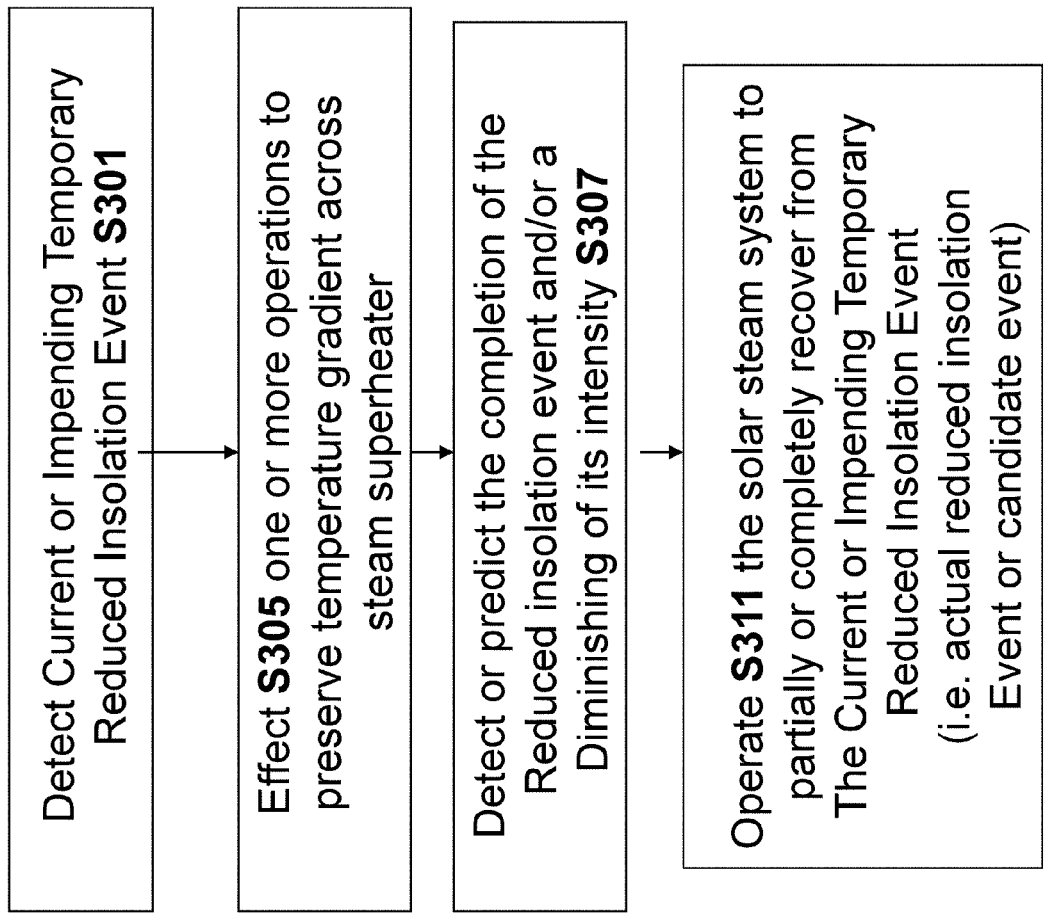
FIG. 4 is a flow chart of a routine for controlling a solar system in response to a predicted or detected temporary/transient reduction in (or elimination of) available insolation.

FIG. 4 is a flow chart of a routine for controlling a solar system in response to a predicted or detected temporary/transient reduction in (or elimination of) available insolation. FIGS. 5-6 and 11A-11B are block diagrams of solar steam systems in which the routine of FIG. 4 may be carried out. In some embodiments, the solar steam system includes a fluid flow control system 842 and/or a heliostat control system 81 that is configured to implement any step or step(s) of the routine of FIG. 4.

Figure 5:
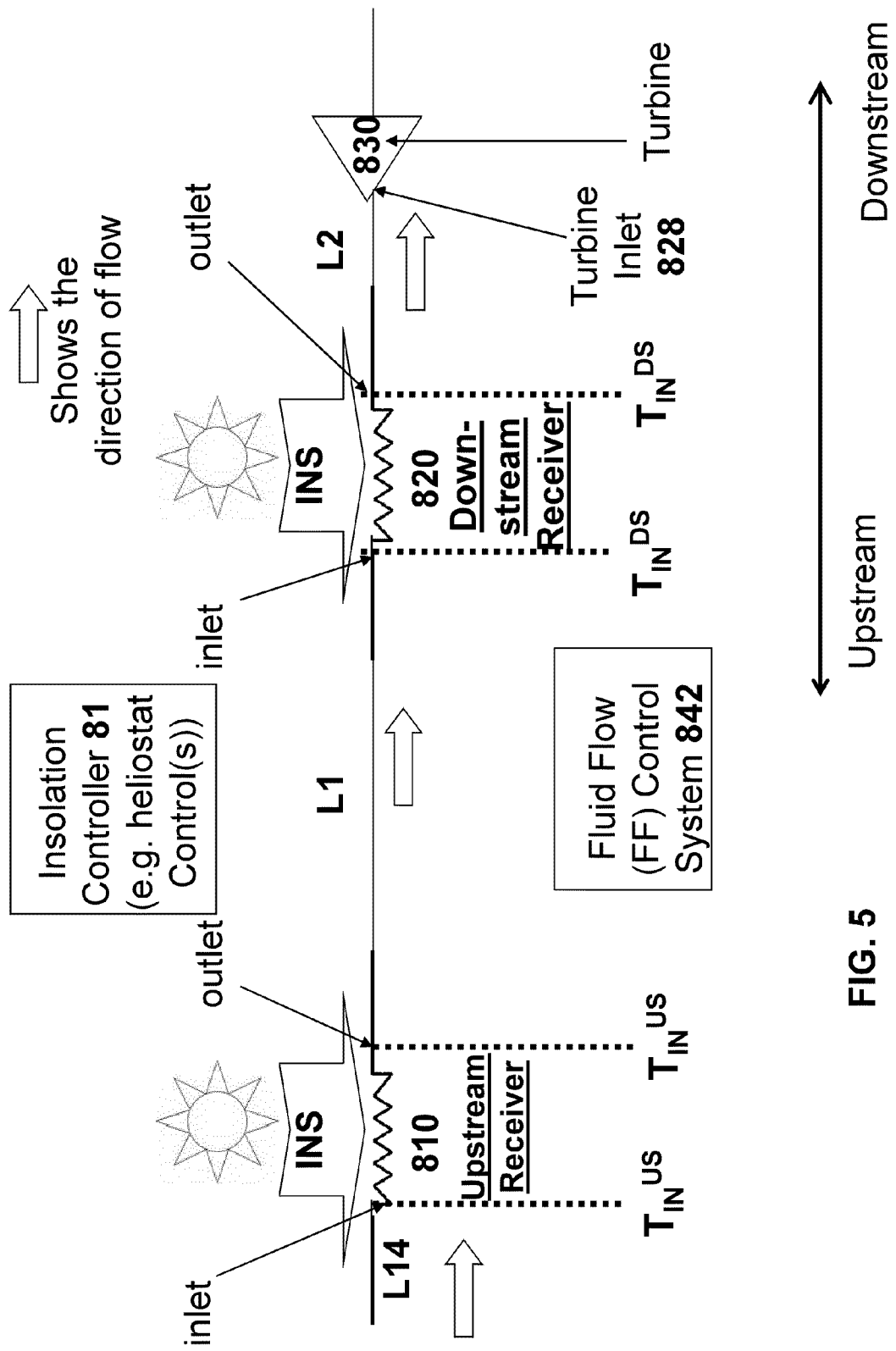
FIGS. 5-6 are block diagrams of various systems (or components thereof) where the routine of FIG. 4 (or step(s) thereof) is implemented.

As illustrated in FIG. 5, solar steam system includes a first solar receiver 810 (for example, configured as an 'upstream solar receiver') and a second solar receiver 820. Additional solar receivers may be present. Alternatively, fewer solar receivers may be present.

In different embodiments, receiver 810 is a solar evaporator configured to boil water into steam, or receiver 810 is a super-critical steam generator configured to generate super-critical steam by heating water or steam to a temperature above a super-critical temperature. The solar evaporator 810 receives liquid and/or vapor $H_2O$ via line L14. The second solar receiver 820 (for example, a solar steam superheater or a solar steam re-heater) further heats steam or supercritical steam received via line L1 generated by the upstream solar receiver 810. The further heated steam is delivered to a turbine 830 having turbine inlet 828 via line L2. Under normal operating conditions, the steam in line L2 is drier than the steam in line L1.

For the present disclosure, it is understood that the term 'turbine' refers to a 'large scale turbine'—for example, whose power output is on the order of magnitude of a megawatt or more. In different embodiments, the power output of the turbine may be at least 1 megawatt, at least 5 megawatts, at least 10 megawatts, at least 50 megawatts or at least 100 megawatts or more.

The terms 'upstream' and 'downstream' relate to system configurations that are associated with some embodiments, and are not intended as limiting.

In certain locations in the present disclosure, upstream receiver 810 is referred to as a 'solar boiler/evaporator' or 'solar evaporator.' It is noted that this is not limiting, and in other examples (even when not explicitly mentioned), upstream receiver 810 (or any receiver labeled as '810') may be a solar supercritical steam generator which generates super-critical steam from liquid and/or vapor water.

Water or steam enters the first solar receiver 810 via line L14 and exits via line L1. Steam or supercritical steam enters the second solar receiver 820 via line L1 and exits via line L2 (also referred to herein as a connecting pipe or CP). Super-heated steam exits the downstream solar receiver 820 via line L2 (or CP) and enters turbine 830 for generating electricity via turbine inlet 828. During normal operating conditions of full insolation, the temperature in the outlet of the steam superheater (or steam reheater 140 of FIG. 11B) can be much hotter than the outlet temperature of the evaporator whose purpose is to convert liquid water (or a mixture of water and vapor) into steam. In different embodiments, the outlet temperature in the steam superheater (or steam reheater 140 of FIG. 11B) is at least 250 or 300 or 350 or 400 or 450 or 500 or 550 or 600 degrees Celsius.

Figure 6:
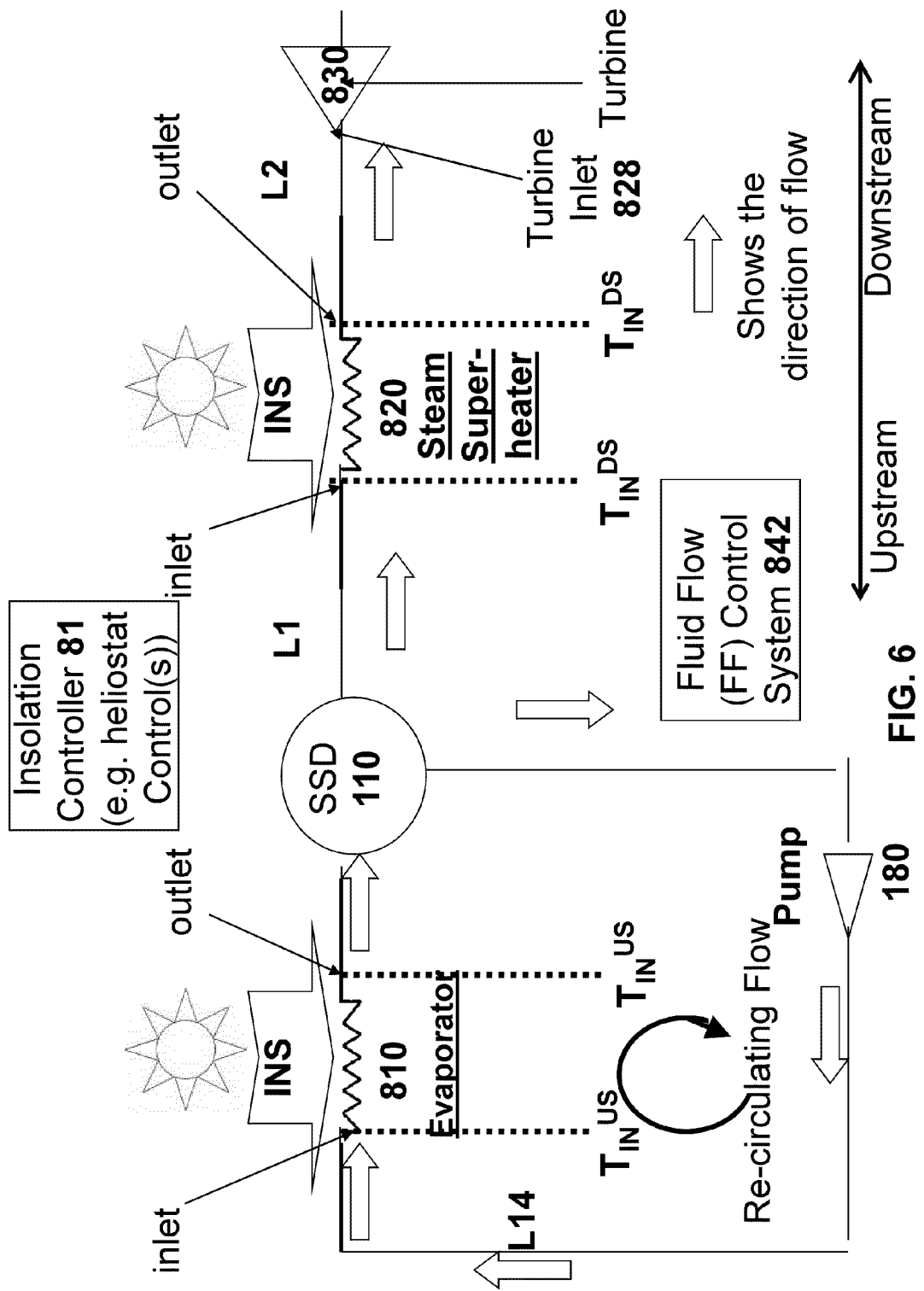

In the example of FIG. 6, receiver 810 is an evaporator/boiler, receiver 820 is a superheater and a steam separation vessel for separating between liquid and vapor phases (e.g., steam separation drum 110) is arranged between 810 and 820. In the example of FIG. 6, solar steam evaporator 810 is configured as a re-circulating boiler (for example, including a pump 108 for re-circulating flow). Thus, liquid or vapor water may make several 'passes' through solar evaporator 810.

In some embodiments, steam separation vessel 110 (e.g., drum) substantially blocks water reaching the superheater 820. This may prevent damage in the short or long term. Blocking may also have the advantage of improving thermal efficiency.

In embodiments, steam separation vessel 110 is specifically a drum, though any dimensions or shape or form factor, for example, effective to separate water vapor and liquid water, may be used.

In addition to the fluid flow control system 842 discussed above, a solar thermal system may also include a heliostat control system for 81 controlling the mechanical behavior of heliostat(s). For example, see the discussion provided below with reference to FIGS. 9-10.

As noted above, steam turbine 130 (or turbine 150) may include a turbine inlet 828 that enables control of the pressure of fluid entering turbine 130 via inlet 828, for example, by controlling the flow resistance such as a valve control or other suitable device. Steam turbines may be controlled at 'start-up' (e.g., in the morning) such that the pressure at the inlet 828 is a linear function of the flow rate. This is referred to as a 'sliding pressure policy.' In some embodiments, one or more flow policies are carried out in steps S305 and/or S311 using a turbine inlet controller (e.g., including the valve control or other suitable device).

In step S301, a current or impending reduced insolation event is detected, for example, at a time when solar steam flows from a solar receiver (e.g., downstream solar receiver 820, for example, a solar superheater or reheater) to a steam turbine 830 where useful work is carried out by the turbine (e.g., to produce electricity).

The detection of step S301 can be carried out in any manner. In one example, the concentration of dust in the atmosphere may be detected by quantifying scattering of a laser. In another example, the sky or the ground (or both) is (are) imaged using one or more cameras and analyzing the image for the presence of clouds or shadows or other classifiable and quantifiable features. In another example, the flux intensity is measured by flux meters mounted on or in any solar receiver. The detecting may be carried out automatically or manually.

In step S305, one or more operations are effected to counteract the degradation of the thermal gradient across solar receiver 820, which may be a steam superheater or a steam re-heater (for example, see element 140 of FIG. 11B below). This 'thermal gradient degradation' (i.e., where the difference between $T_{OUT}$ and $T_{IN}$ of receiver 820 decreases) results from the reduced insolation even, since less solar radiation is available to heat fluid within receiver 820.

Figure 9:
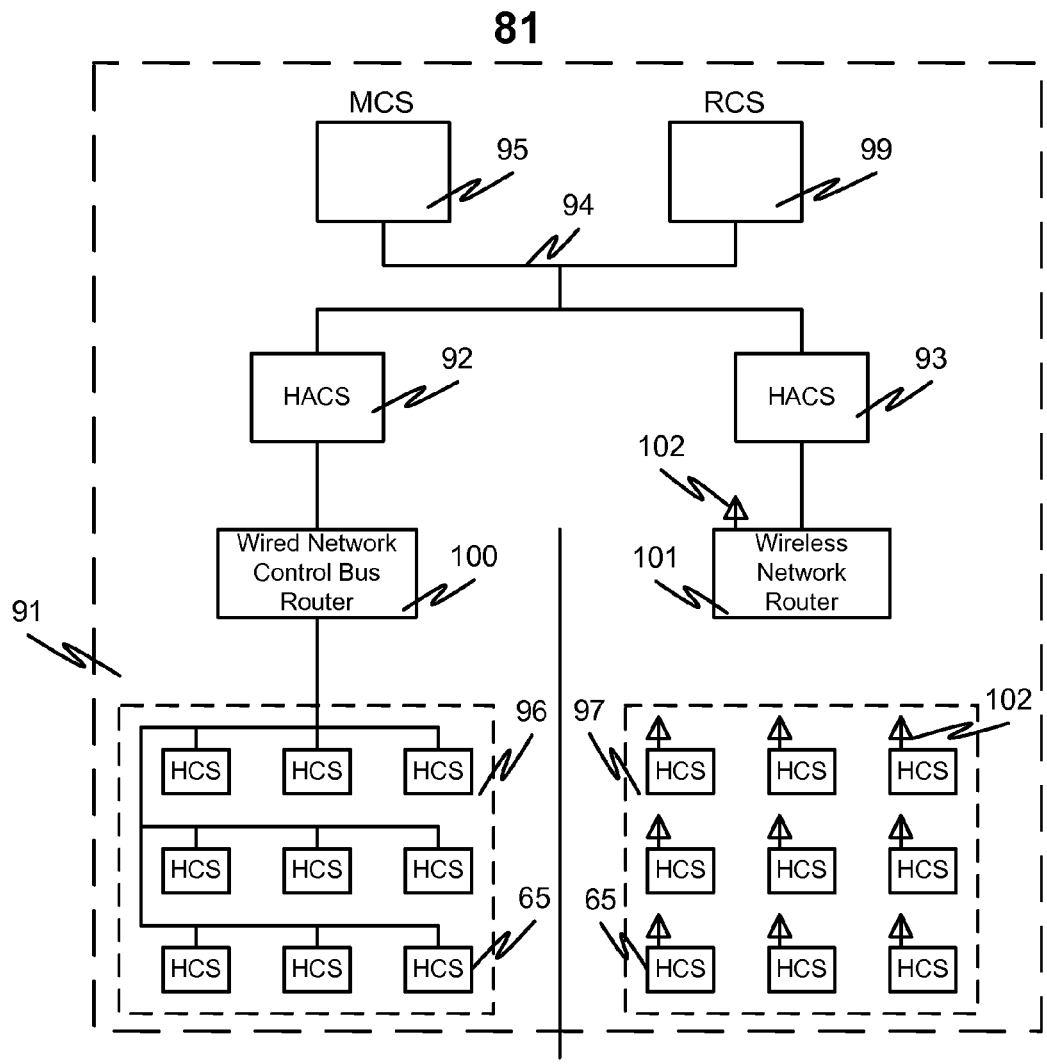
FIGS. 9-17 are additional block diagrams of various systems (or components thereof) where the routine of FIG. 4 (or step(s) thereof) is implemented.

For example, step S305 may be carried out by generating an electrical control signal and/or sending an electrical control signal to fluid flow control system 842 and/or heliostat control system 81 (see FIG. 9).

In one example, a rate of flow of fluid from the first solar evaporator 810 (e.g., which may be configured as an 'upstream' receiver) to the second solar receiver 820 (for example, via an optional steam separation vessel) is reduced and/or a flow rate of superheated steam from solar receiver 820 into turbine 130 is reduced. In embodiments, this flow reduction may reduce the amount of electricity generated during the 'reduced insolation time period' (i.e., either a time period where insolation is actually reduced or when one or more indicators predictive of a current or impending insolation reduction have been detected).

Figure 8:
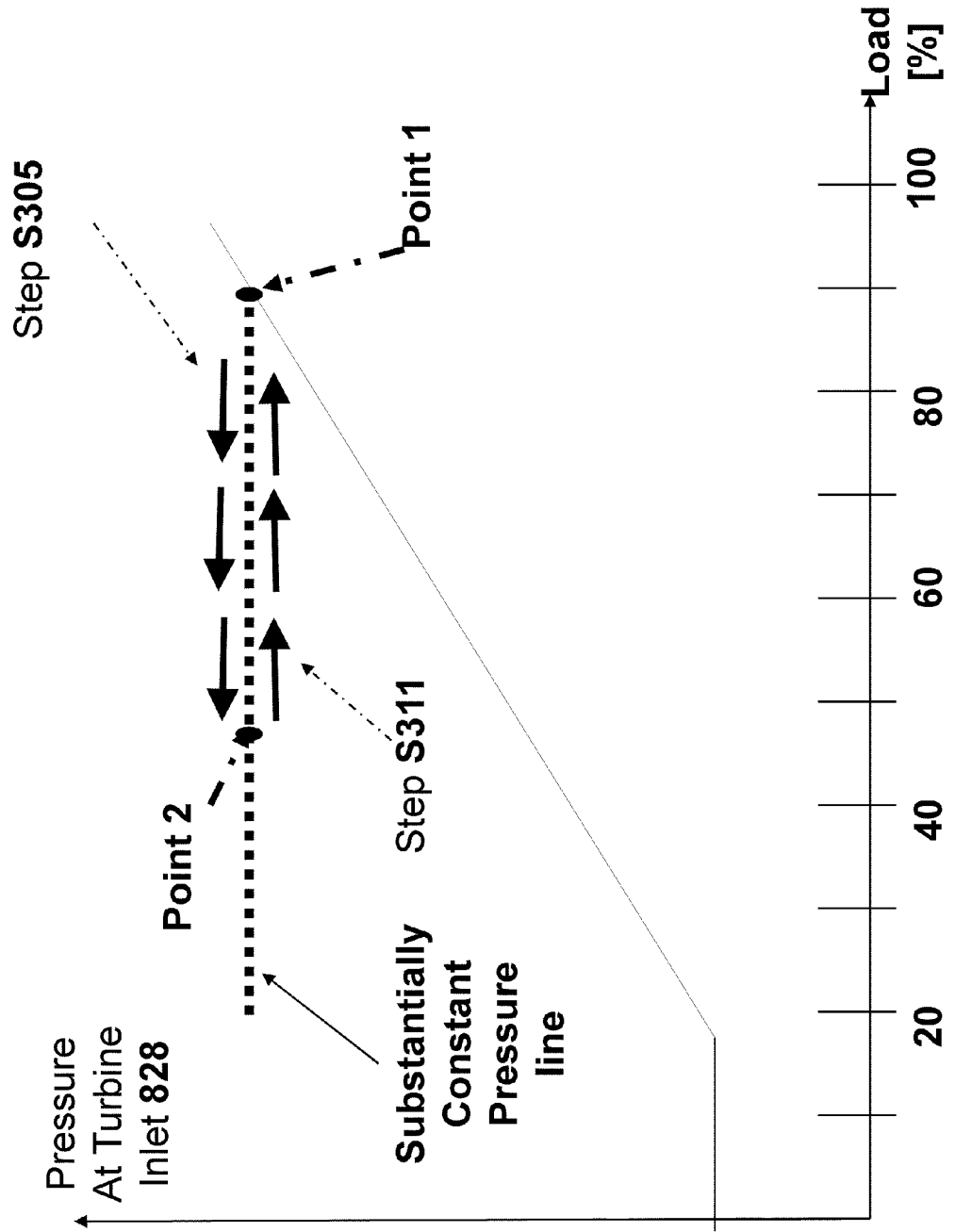

In one example, turbine inlet 828 may be 'throttled' to reduce the flow of steam into turbine 130. For example, as illustrated in FIG. 8, the turbine can be operated so that the pressure of inlet steam remains substantially constant even as the flow rate of steam into turbine (i.e., 130 or 150) is reduced 'significantly' (e.g., a decreasing load range that is at least 10% or at least 15% or at least 20% or at least 30% or at least 50% or at least 70% of the maximum load capacity). As used herein, '% load' or 'load capacity' may refer synonymously to the rate of steam flow into turbine 130 (or 150) and/or the amount of electricity generated by turbine (as a percentage of the maximum).

Alternatively or additionally, in step S305 heliostats are diverted from the upstream receiver 810 to the downstream receiver 820 so that the relative fraction of available insolation that is allocated to the downstream receiver 820 increases. For example, heliostat control system 81 may re-direct the heliostats accordingly. Additional discussion with respect to heliostat control in steps S305 or S311 to modify a 'sub-system insolation ratio' in response to the cloud conditions (or any other parameter relating to reduced insolation) is provided with reference to FIG. 12.

Alternatively or additionally, in some implementations of S305, the rate at which enthalpy flows from a first 'sub-system' of the solar steam system to a second 'sub-system' thereof is reduced, thereby conserving enthalpy in the first sub-system (see FIGS. 11, 13 and the accompanying discussion).

Alternatively or additionally, in step S305 (see FIGS. 15-18), it is possible to introduce external steam (for example, from a fossil-fuel fired boiler or an electric boiler 190) into the solar thermal system, and to force the external steam to flow in a direction that is the opposite of the direction in which solar steam flows (e.g., within one or more of the solar receivers such as superheater 820 and/or reheater 140).

In step S307, a detection or prediction related to the conclusion (or reduction in its 'intensity') of the reduced insolation event is made and/or an updated prediction (or detection) is carried out that nullifies a previous prediction of reduced insolation (e.g., a prediction that in retrospect was false). In different non-limiting examples, the 'intensity' of a reduced insolation even may relate to the intensity or thickness of cloud coverage and/or the intensity (or concentration) of dust and/or the extent of a solar eclipse.

In a first example relating to step S307, an actual increase in the insolation level may be predicted or detected after an actual reduced-insolation event occurs.

In a second example, there is no requirement for an actual reduction in insolation in step S301 and no requirement for an actual (or predicted) increase in insolation in step S307. According to this second example, in step S301 a prediction is made (or some indication of current or future reduced insolation is detected) related to a reduction in insolation—for example, clouds coverage may be detected 5 kilometers south of a solar thermal power facility. In step S307, further information (e.g., later information) indicates that the 'pessimistic scenario' predicted (e.g., because of nearby cloud coverage) did not or will not occur.

The detecting of step S307 may be carried out in any manner, for example, see step S301. The predicting of steps S301 or S307 may also be carried out in any manner. In an example, it is possible to utilize historical data (for example, describing how long cloud coverage persists in a certain location). Alternatively or additionally, it is possible to detect one or more physical parameters (e.g., cloud coverage, flux or any other physical parameter) at multiple points in time and to use time series techniques or neural networks or any other prediction algorithm.

In step S311, the solar steam system is operated to partially or completely recover from the actual or predicted reduced insolation event (i.e., whether or not the actual event occurred, there may be a need to 'recover' from the operation(s) of step S305). For example, a rate of flow through a solar receiver 820 and/or through a turbine may be increased. In another example, heliostats may be redirected from the solar receiver 820 back towards an evaporator (or supercritical steam generator) 810.

As noted above, the routine of FIG. 4 does not require an actual reduction in insolation and/or does not require a reduction in insolation that is sustained for any period of time.

Thus, in a first example, there is no actual reduction in insolation. Instead, in step S301, a prediction of an impending reduction in insolation is made, the system reacts accordingly in step S305. For example, it is possible to move from 'Point 1' of FIG. 8 to 'Point 2' of FIG. 8 on the substantially constant pressure line (for example, reducing the load by an amount that is at least 15% or at least 20% or at least 25% or at least 30% of a maximum turbine load/input flow rate in less than 20 minutes or less than 10 minutes or in only a few minutes). In step S311, it turns out the prediction is only a 'false alarm,' and it is possible to substantially return from Point 2 to Point 1, also in a matter of minutes. In some embodiments, this entire process of FIG. 4 may occur in less than 60 minutes or less than 30 minutes or less than 20 minutes.

In a second example, the amount of reduction in insolation is only minimal—for example, less than 30% or less than 20% or less than 10% or less than 5%. By operating to carry out the routine of FIG. 4, it is possible to increase the likelihood that such a reduction in insolation would cause turbine 'shut-down' (and its associated extended start-up process).

Figure 7A:
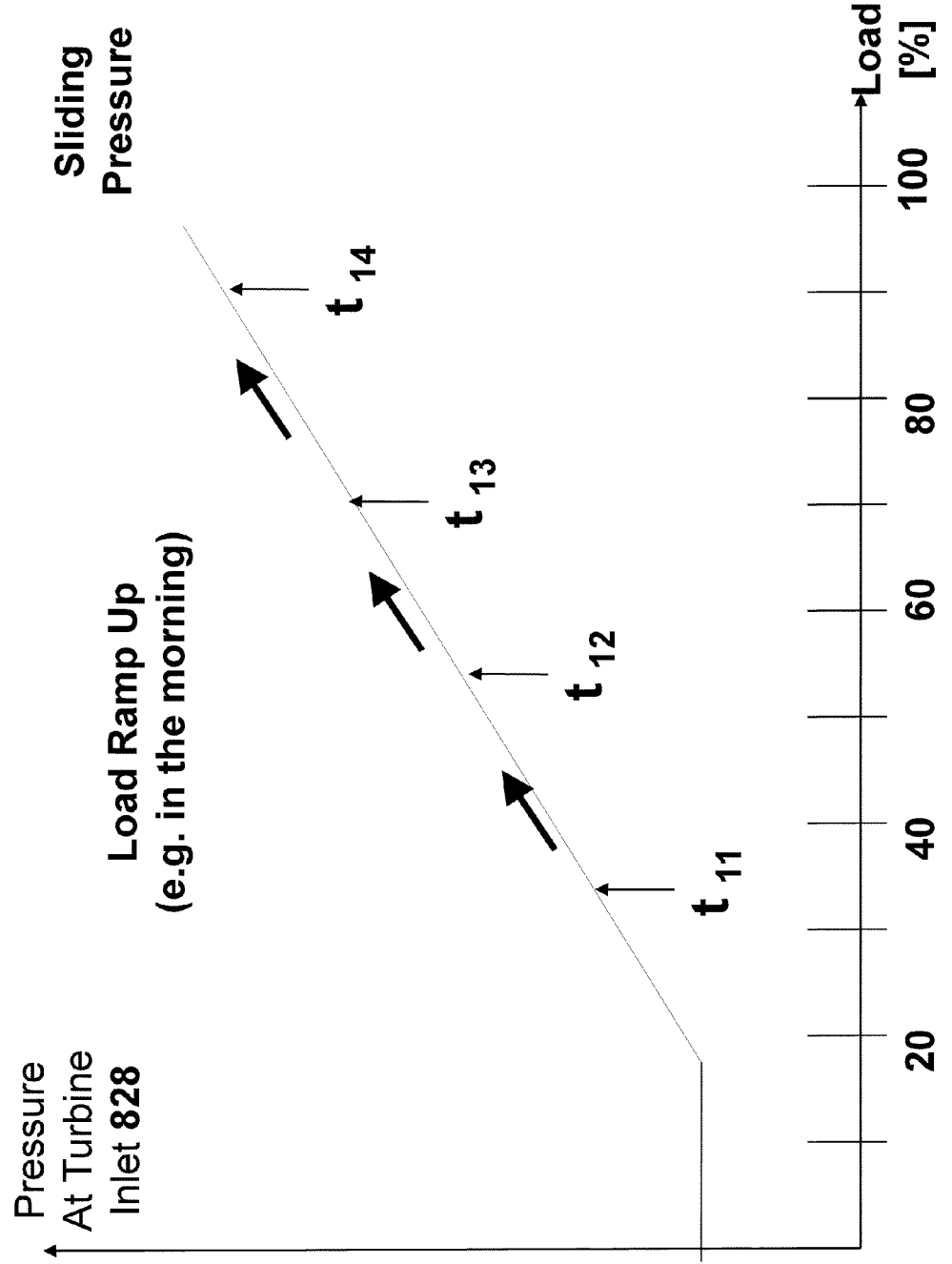
FIGS. 7-8 are graphs related to sliding and constant pressure policies within a steam turbine that is supplied by solar steam.

FIG. 7A illustrates how turbine steam pressure (i.e., increases as a function of time during startup, for example, in the morning) at any location in the turbine (130 or 150 or 830 or 530), for example, at an inlet 828 location. There are four points in time illustrated in FIG. 7A—an initial point in time $t_{11}$, and then subsequent points in time where $t_{12}$ is later than $t_{11}$, $t_{13}$ is later than $t_{12}$, and $t_{14}$ is later than $t_{13}$.

Figure 7B:
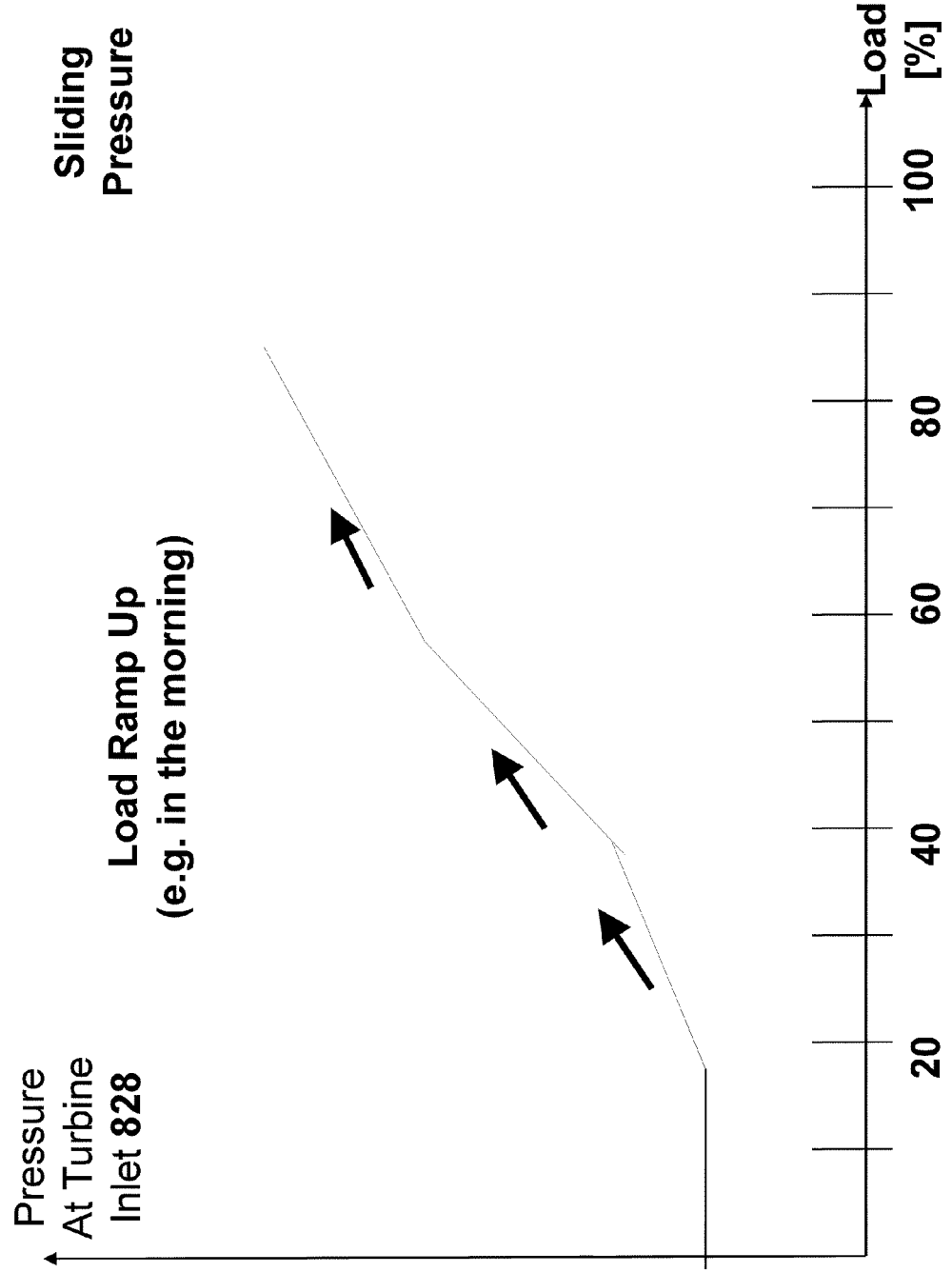

As the load increases, the turbine control system (a part of fluid flow control system 842) is operated so that the pressure increases linearly with the flow load. It is noted that the 'ramp-up' of FIGS. 7A-7B may take a significant amount of time—for example, at least 30 minutes or at least 60 minutes or at least 90 minutes. As illustrated in FIG. 7B, the 'linear ramp-up' or 'sliding pressure' regime may relate to a plurality of straight lines, rather than a single straight line.

FIG. 8 describes relatively quick substantially constant pressure ramp-down procedure that may be implemented in according with step S305. In the routine of FIG. 8, it is possible to reduce flow into turbine 130 while maintaining the pressure substantially constant. In general, increasing the resistance to flow into the turbine 130 (for example, by closing one or more valves) may be used to increase the pressure at the inlet to the turbine and/or in solar receiver 820 and/or to decrease the rate of flow. Thus, by reducing the flow rate (and hence the load percentage) into turbine 130 (i.e., so the load reduction is at least 15% or at least 20% or at least 30% of the maximum load), it is possible to counteract the natural drop in pressure (and temperature) that would be experienced during times of reduced insolation.

In FIG. 8, starting from a load fraction that is at least 50% or at least 60% or at least 70% or at least 80% of the maximum, it is possible to drop the load fraction (i.e., the flow rate of steam into turbine 130 or 150) by at least 15% of at least 30% (i.e., at least 15% or 30% of the maximum load) while maintaining the pressure substantially constant. In some embodiments, it is possible to carry out the load drop off at substantially constant pressure relatively quickly, for example, in less than 15 minutes or less than 10 minutes or less than 5 minutes or less than 3 minutes. In FIG. 8, this pressure drop is illustrated as moving from "POINT 1" to "POINT 2"—this may be carried out in step S305 of FIG. 4.

In contrast to the sliding-pressure ramp-up which may take considerable time, the load reduction at substantially constant pressure may occur relatively quickly in step S305 of FIG. 4—similarly, the substantially constant pressure 'recovery' where the load returns to close to its previous value before the load reduction may also occur relatively quickly.

The 'constant pressure' policy that may be enforced during steps S305 and/or S311 does not require that the pressure stays absolutely constant, and that there may be slight fluctuations. For example, there may be fluctuations that do not considerably increase the amount of time required for a subsequent 'recovery' in step S311 when the load returns to close to its previous value before the load reduction may also occur relatively quickly. In non-limiting embodiments, the magnitude of these pressure fluctuations may be at most at most 30% or at most 20% at most 15% or at most 10% or at most 5% or at most 3% or at most 1% of the pressure drop fluctuation that would have been observed had the turbine 'remained on the sliding pressure line' of FIG. 7A or 7B with a similar drop in 'turbine load' (i.e., steam input flow rate or power production rate)—i.e., a drop along the actual 'sliding pressure line(s) of the particular turbine/system.

In step S311, it is possible to effect a recovery by moving back from "POINT 2" to "POINT 1" on the substantially constant pressure line. As noted above, because the pressure remains relatively constant, it is possible to effect this load increase relatively quickly—e.g., within a matter of minutes and/or in an amount of time that it at most 30% or at most 20% or at most 10% or at most 5% the amount of time required to a effect a similar load increase during 'ramp-up' where a sliding pressure policy is maintained (see FIGS. 7A-7B).

During days of intermittent clouds, it is possible to move back and forth on the substantially constant pressure line multiple times as the sky becomes intermittently cloudier and less cloudy—thus, step S305 and S311 illustrated in FIG. 8 may be carried out a number of times.

FIG. 9 illustrates a heliostat field control system 81 in some embodiments, for example, configured to participate in the routine of FIG. 4. In an example, a central heliostat field control system communicates hierarchically through a data communications network with controllers of individual heliostats. FIG. 9 illustrates an example of such a hierarchical control system 81 that includes three levels of control hierarchy, although in other implementations there can be more or fewer levels of hierarchy, and in still other implementations the entire data communications network can be without hierarchy, for example, in a distributed processing arrangement using a peer-to-peer communications protocol.

At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 38 in heliostat fields 96, 97 respectively, by communicating with programmable heliostat control systems 65 associated with those heliostats 38 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 9, the portion of network 94 provided in heliostat field 96 is based on copper wire or fiber optics connections, and each of the programmable heliostat control systems 65 provided in heliostat field 96 is equipped with a wired communications adapter 76, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications adapter 77, as are heliostat array control system 93 and wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

In some embodiments, the controller system 81 of FIG. 9 is programmed to participate in the routine of FIG. 4 in any central heliostat system in FIGS. 10A-10E (or in any other system). For example, in steps S305 and/or S311 heliostats may be re-aimed by control system 81 from one solar receiver (or receiver type) to another. In one example, in step S305, heliostat are re-directed from the evaporator or steam generator 810 to the superheater 820, and in step S311 the movement of heliostats is in the opposite direction.

FIGS. 10A-10E illustrate in various examples heliostats which aim reflected beams of sunlight at either the upstream 810 or downstream 820 solar receiver. In the non-limiting example of FIGS. 10A-10C only six heliostats are illustrated. However, any number of heliostats may at any given time be aimed at the upstream or downstream solar receiver, for example, fewer than 100, or 10-1,000 heliostats or 1,000-10,000 heliostats or more than 10,000 heliostats.

Figure 10D:
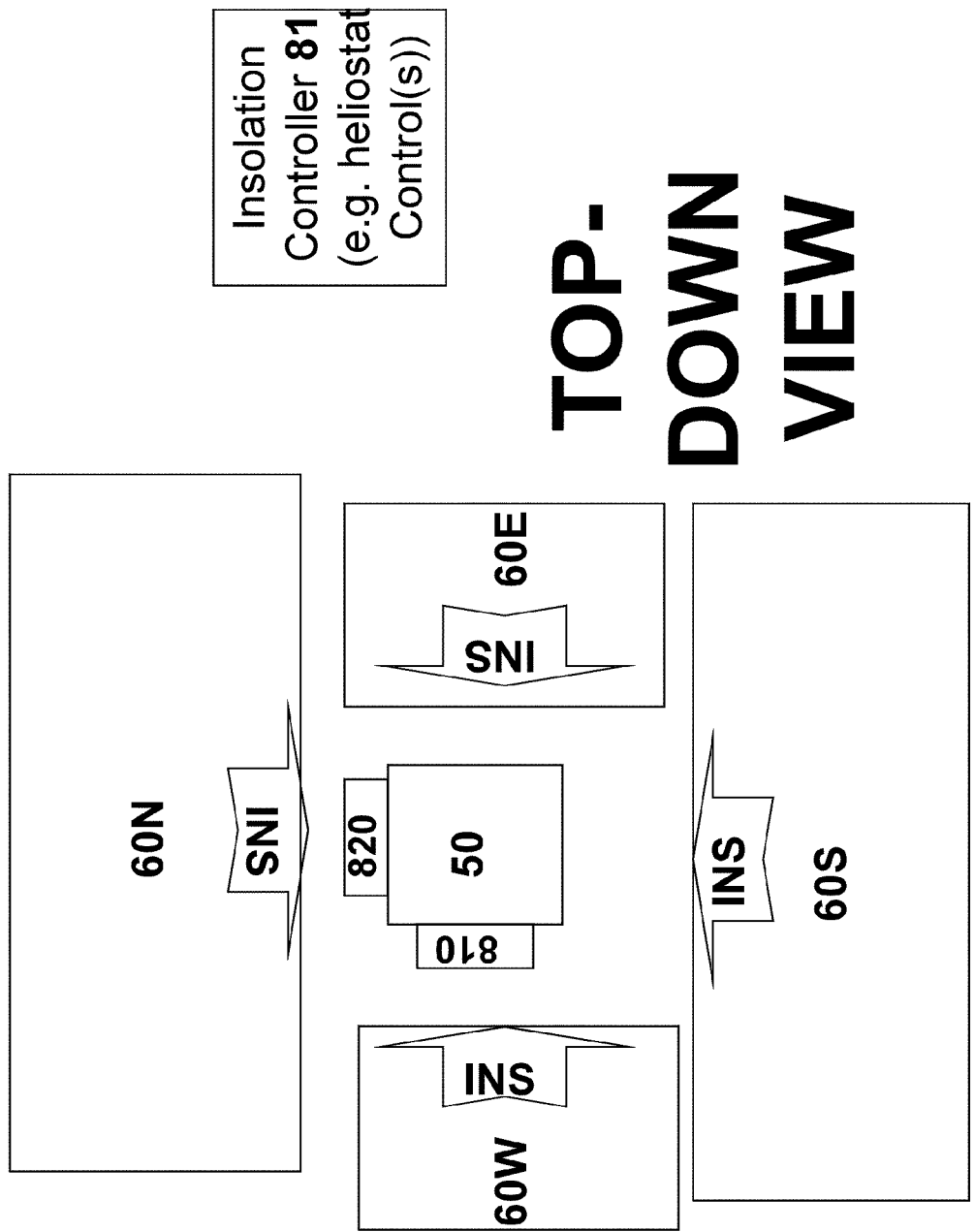

In FIG. 10A, the set of heliostats aimed at one or the other solar receivers (810 or 820) is {920A, 920B, 920C, 920C, 920D, 920E, 920F}. The sub-set of heliostats aimed at 810 is {920A, 920D, 920E} and the sub-set of heliostats aimed at 820 is {920B, 920C, 920F}. The upstream receiver 810 is above downstream receiver 820. In FIG. 10B, upstream receiver 810 is below downstream receiver 820. In FIG. 10C, a 'side-by-side' configuration is illustrated. FIG. 10D is a plan view of a system where upstream receiver 810 and downstream receiver 820 are on different sides of the tower 50. In the non-limiting example of FIG. 10D, (i) receiver 820 is mounted to a north face of tower 50 and receives insolation primarily from a northern field of heliostats 60N; and (ii) receiver 810 is mounted to a west face of tower 50 and receives insolation primarily from a western field of heliostats 60W. In the examples of FIGS. 10A-10D, two solar receivers (810 and 820) are on tower 50; however, more than two solar receivers may be on the tower in other embodiments.

Figure 10E:
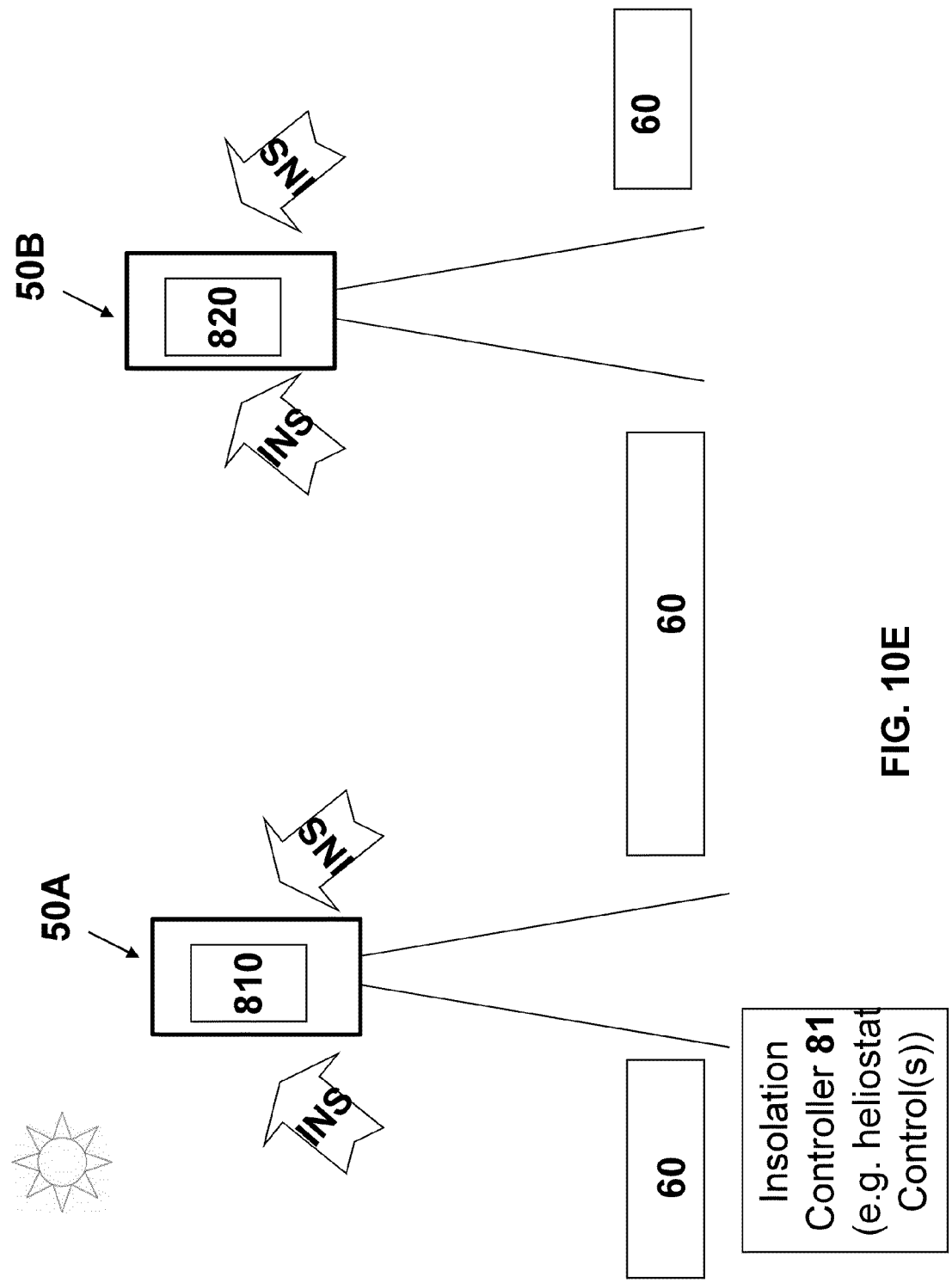

In the example of FIG. 10E, there is a plurality of solar towers 50, each tower being associated with a respective solar receiver. At any given time, a given heliostat may be directed to a solar receiver of any one of the towers. One particular example of a suitable multi-tower system is any of the tower systems illustrated in co-pending U.S. application Ser. No. 12/532,942, filed Sep. 24, 2009 and published as U.S. Publication No. 2010-0191378 on Jul. 29, 2010, the contents of which are hereby incorporated by reference herein. Other examples are also possible. For example, the receivers 810 and 820 may be discontinuous tiles forming a discontinuous set of many elements of any shape, such as hexagonal and arranged in any relative relationship, such as diagonally displaced.

Figure 11A:
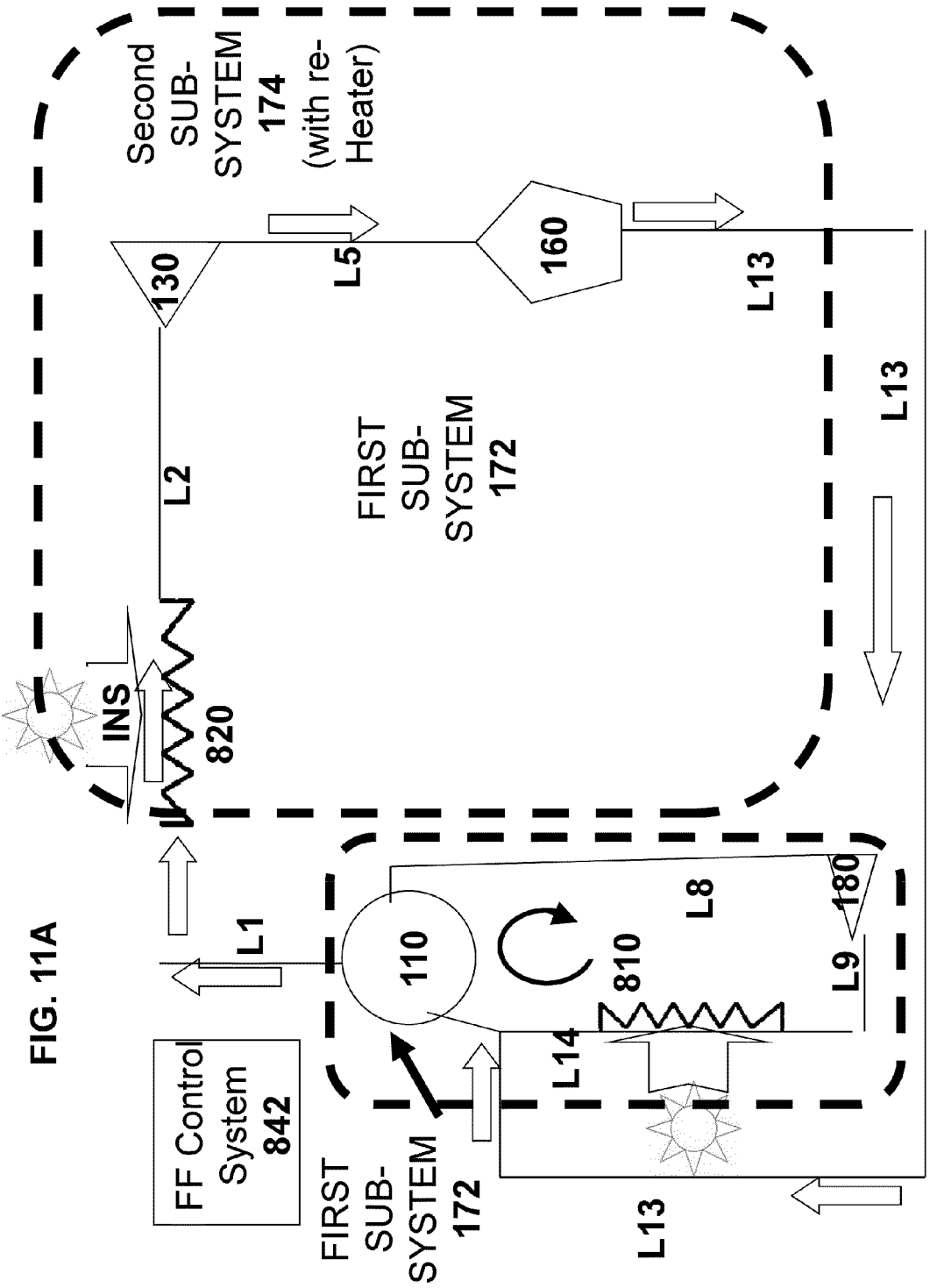
Figure 11B:
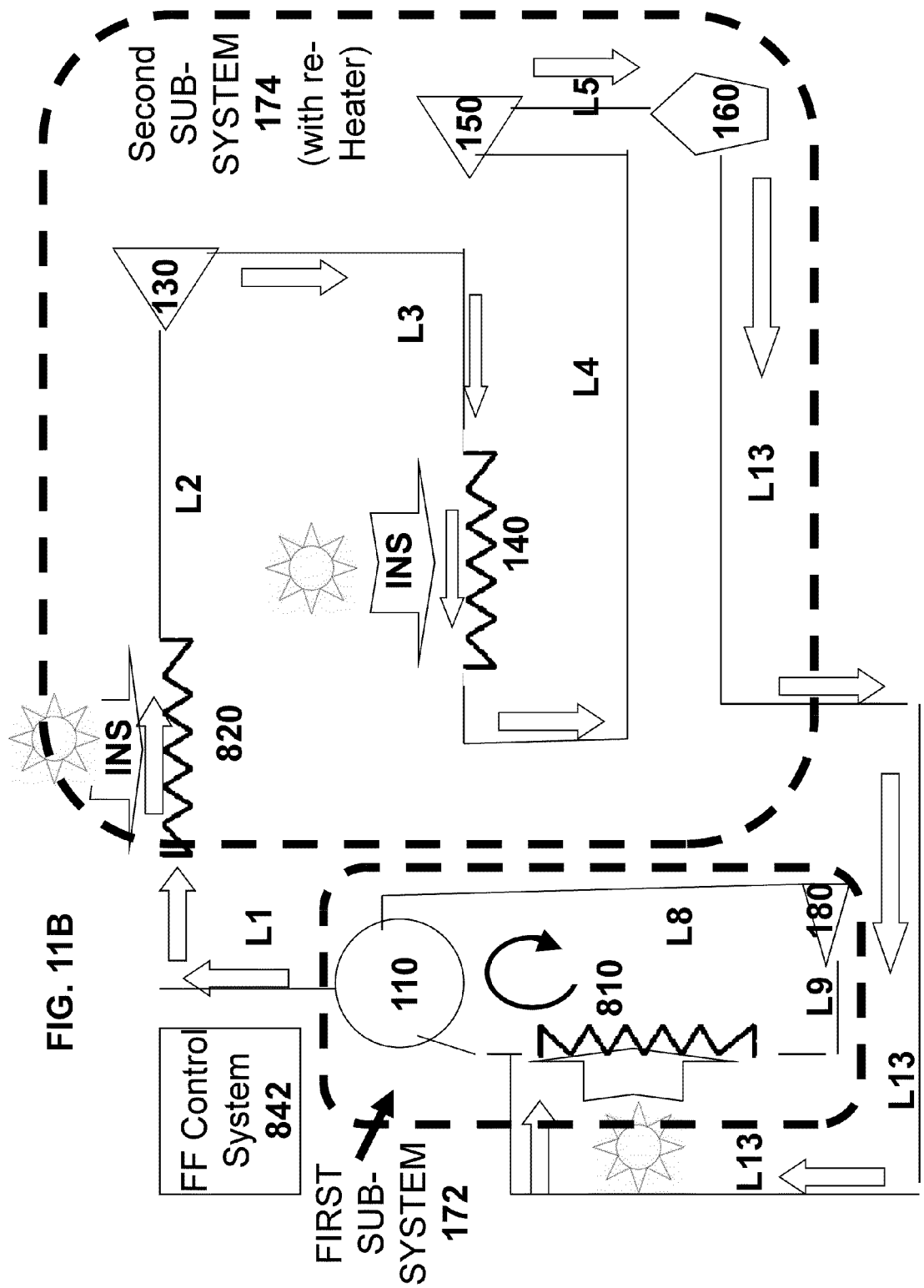

FIGS. 11A-11B illustrate solar thermal systems—the example of FIG. 11B includes a solar reheater. In some embodiments, the systems of FIGS. 5 and/or 6 can be part of the larger system that is described in FIG. 11A or 11B. FIG. 11B is a block diagram of a solar boiler system 100 for generating power (for example, electric power) from solar energy according to some embodiments. System 100 includes: (i) a steam separation drum 110 from which saturated steam exits; (ii) a solar steam superheater 120 which receives the saturated steam via line L1 and superheats the saturated steam to produce superheated steam; (iii) a high-pressure (HP) turbine 130 which generates work from the superheated steam; (iv) a solar steam reheater 140 which reheats steam that exists the HP turbine 140; (v) a low-pressure (LP) turbine 150 which generates work from the reheated steam; and (vi) a condenser 160 (for example, air-cooled or cooled in any other manner) which cools the steam that exits from the low-pressure (LP) turbine 150.

Referring to FIGS. 11A and 11B, water and/or steam, indicated by the block arrows, flows as follows: (i) Saturated steam flows from the steam separator 110 (in embodiments, a separation drum) to solar steam superheater 120 via line L1; (ii) drier or 'dry' steam flows from solar steam superheater 120 to high-pressure (HP) turbine 130 via line L2; (in FIG. 11B) (iii) 'HP outlet steam' exits high-pressure (HP) turbine 130 flow to solar steam reheater 140 via line L3; (iv) re-heated steam flows from solar steam reheater 140 to low-pressure (LP) turbine 150 via line L4; (v) in FIG. 11B, water and/or steam leaves LP turbine 150 via line L5 and flows to the condenser 160 while in FIG. 11A, the flow is from the HP turbine 130 directly to the condenser 160; (vi) the condensed water leaves condenser 160 via line L6 and is pumped by pump 170 back (via line L7) to a feedwater container (e.g., a feedwater drum) of a solar steam generator (not shown) or alternatively to a treatment plant (not shown).

Both the solar superheater 120 and the solar reheater 140 operate by receiving insolation. In an example, solar superheater and/or solar reheater include a plurality of pipes, for example as described in, and with reference to, FIGS. 14A-14B and 16A-16B. In one non-limiting example, steam is heated at least 50 or 75 or 100 or 150 or 200 degrees Celsius by superheater 120. For example, steam may be delivered via line L1 at a temperature of about 300 degrees Celsius to SH 120, and heated to about 540 degrees Celsius. This 540 degrees Celsius superheated steam is delivered via line L2 to HP turbine 130. In another example, the steam may be heated to supercritical temperatures and pressures. Typically, system 100 operates in a "normal" mode when there is sufficient insolation to provide steam at the temperature and pressure required by one or more of the turbine(s). For example, HP turbine 130 may require steam at a minimum temperature in order to operate at a desired cycle efficiency.

As shown in FIGS. 11A-11B, a solar thermal system can have two subsystems: (i) a first sub-system 172 including the re-circulation loop (i.e., including solar evaporator 810 and a steam separation vessel (e.g., steam separation drum 110)) and (ii) a second sub-system 174 including a steam superheater 820 and one or more turbines and optionally a steam reheater 140 and a condenser 160. In FIGS. 11A-11B, steam flows via line L1 from the first sub-system 172 into the second sub-system 174, while feedwater from condenser 160 flows back (i.e., via line L13) from the second sub-system 174 to the first sub-system 174. Thus, there is a net enthalpy flow into the second sub-system 174 from the first sub-system 172.

Also illustrated in FIGS. 5-6 and 11A-11B is a fluid flow control system 842 for controlling the rate and/or direction of fluid (i.e., liquid or vapor) flow and/or the pressure in one or more vessels or receivers or turbines or connecting lines. Fluid flow control system 842 may include any combination of (i) mechanical apparatus as the 'mechanical portion' of the control system (for example, including valves, valve controls, motors. actuators) and (ii) electrical circuitry (for example, any combination of analog and/or digital electronics and optionally computer-executable code stored in computer memory or storage) as the 'electrical portion' of the fluid flow control system. The behavior of the mechanical portion of the fluid control system may be regulated by the electrical portion of the fluid control system so that generating an electrical control signal causes the mechanical portion of the control system to respond to regulate flow rate, pressure, flow direction or any other flow property. Thus, it is possible to use electrical signals (e.g., generated by circuitry and/or executing software) to regulate mechanical flow properties.

Fluid flow control system 842 may be located in any location or combination of locations (i.e. localized and/or distributed control system). Note that the fluid flow control system 842 has only been represented schematically in the figures as a 'black box,' but can include one or more components, devices, or systems to allow control of fluid flow and/or pressure in the first sub-system, the second sub-system, or both sub-systems.

As used herein, the term boiler or solar receiver may be used to refer to any heat transfer and/or receiver combination whether or not boiling actually takes place therein. For example, either the term boiler or the term solar receiver may be applied to a solar steam superheater. The terms 'solar evaporator' or 'evaporator' or 'boiler/evaporator' are used synonymously to refer to a solar receiver configured to heat water from a liquid to a gaseous state. A boiler/evaporator (for example, 810) is one example of a 'solar receiver' 500. Another example of a solar receiver 500 is a 'steam superheater' (for example, 820). Another example of a solar receiver 500 (not shown in the figures—for example, this may be an upstream 810 or downstream 820 solar receiver) is a supercritical steam generator which generates supercritical steam. Yet another example of a solar receiver 500 (also not shown) is a solar re-heater, which is used to reheat low- or intermediate-pressure steam extracted from a steam turbine with a reheat cycle. Each 'solar receiver' typically has a set of operating parameters (i.e., temperature and/or pressure and/or flow volumes) permitted by the manufacturer.

Figure 12:
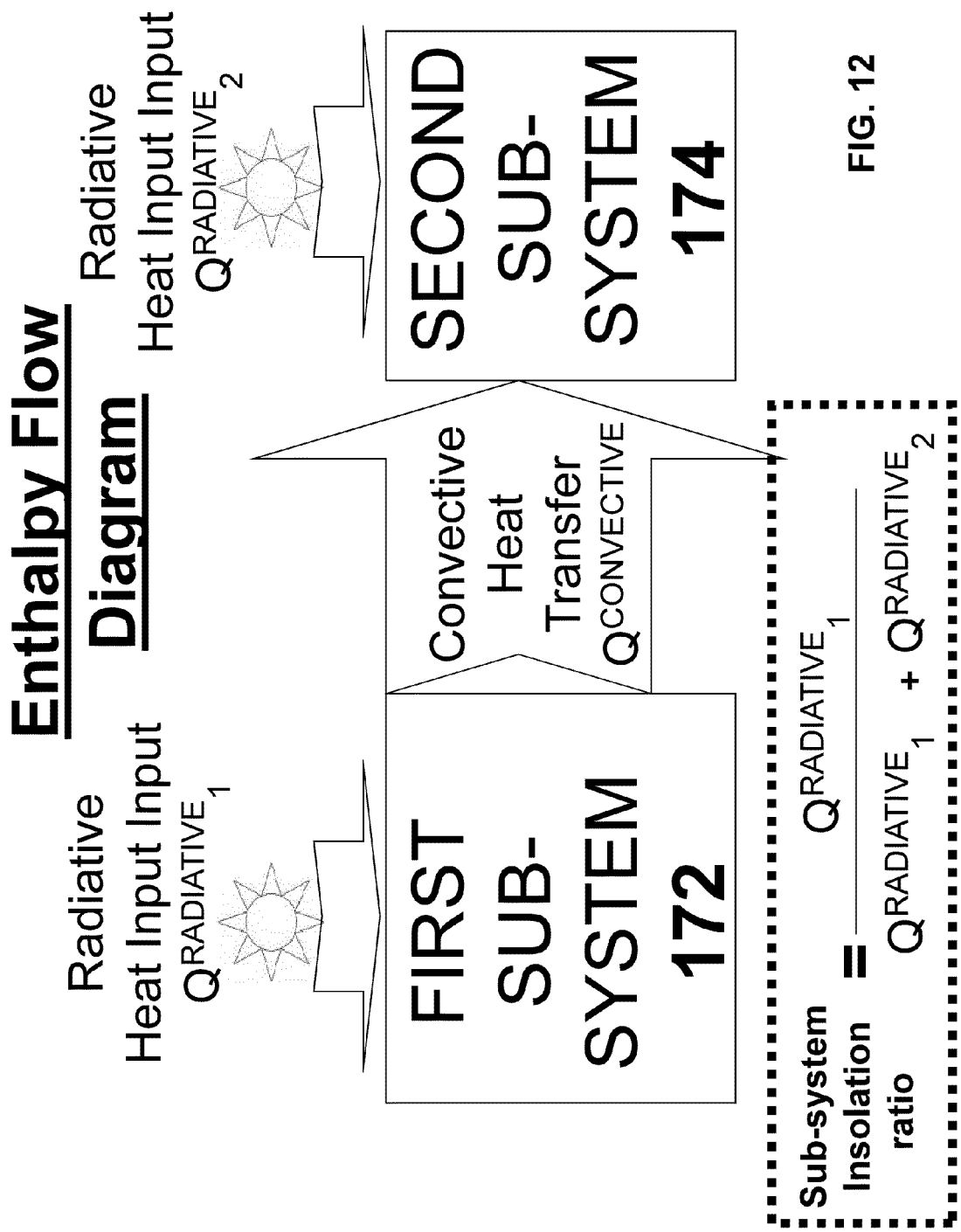

FIG. 12 relates, for example, to the system of FIG. 11 where there is a first sub-system 172 including a solar boiler/evaporator 810 (optionally re-configured as a re-circulating boiler) and a second sub-system 174 including a steam superheater 820 and one or more turbines 130. FIG. 12 is an enthalpy flow diagram describing enthalpy flow in the two sub-systems. Insolation directed to solar target(s) of the first sub-system (for example, evaporator 810) is labeled as $Q^{RADIATIVE}_1$. Insolation directed to solar target(s) of the second sub-system (for example, to steam superheater 820 and optionally steam re-heater 140) is labeled as $Q^{RADIATIVE}_2$. In addition, there is a net convective heat transfer between the two sub-system, i.e., the fluid flowing from the first sub-system 172 to the second sub-system 174 is hotter than the returning fluid flowing back from second sub-system 174 to the first sub-system 172.

The total amount of insolation fed into both sub-systems is the sum of $Q^{RADIATIVE}_1$ and $Q^{RADIATIVE}_2$. The fraction of the total amount of insolation fed to the first sub-system is defined as the 'sub-system insolation ratio.' The sub-system insolation ratio is defined mathematically in FIG. 12. A larger value of the sub-system insolation ratio would indicate that more heliostats are directed to solar receivers of the first sub-system (e.g., upstream receiver 810, such as a solar evaporator and/or a solar superheated steam generator) at the expense of heliostats directed to solar receivers of the second sub-system. Conversely, a smaller value of the sub-system insolation ratio would indicate that fewer heliostats are directed to solar receivers of the first sub-system (e.g., upstream receiver 810). Instead, these heliostats are directed to solar receivers of the second sub-system.

Two thermodynamic processes are illustrated in FIG. 12: (1) a convective thermodynamic process driven the flow of enthalpy from the first 172 sub-system to the second 174 sub-system and (2) a solar-radiation thermodynamic process driven by $Q^{RADIATIVE}_1$ and $Q^{RADIATIVE}_2$. In some embodiments, and/in steps S305 or S311 in response to detected or predicted 'reduced-insolation conditions', it is possible (i) to modify the rate of enthalpy flow from the first 172 sub-system to the second 174 sub-system thereby influencing the convective thermodynamic process and/or (ii) to modify the heliostat aiming policy to influence the solar-radiation thermodynamic process.

Figure 13A:
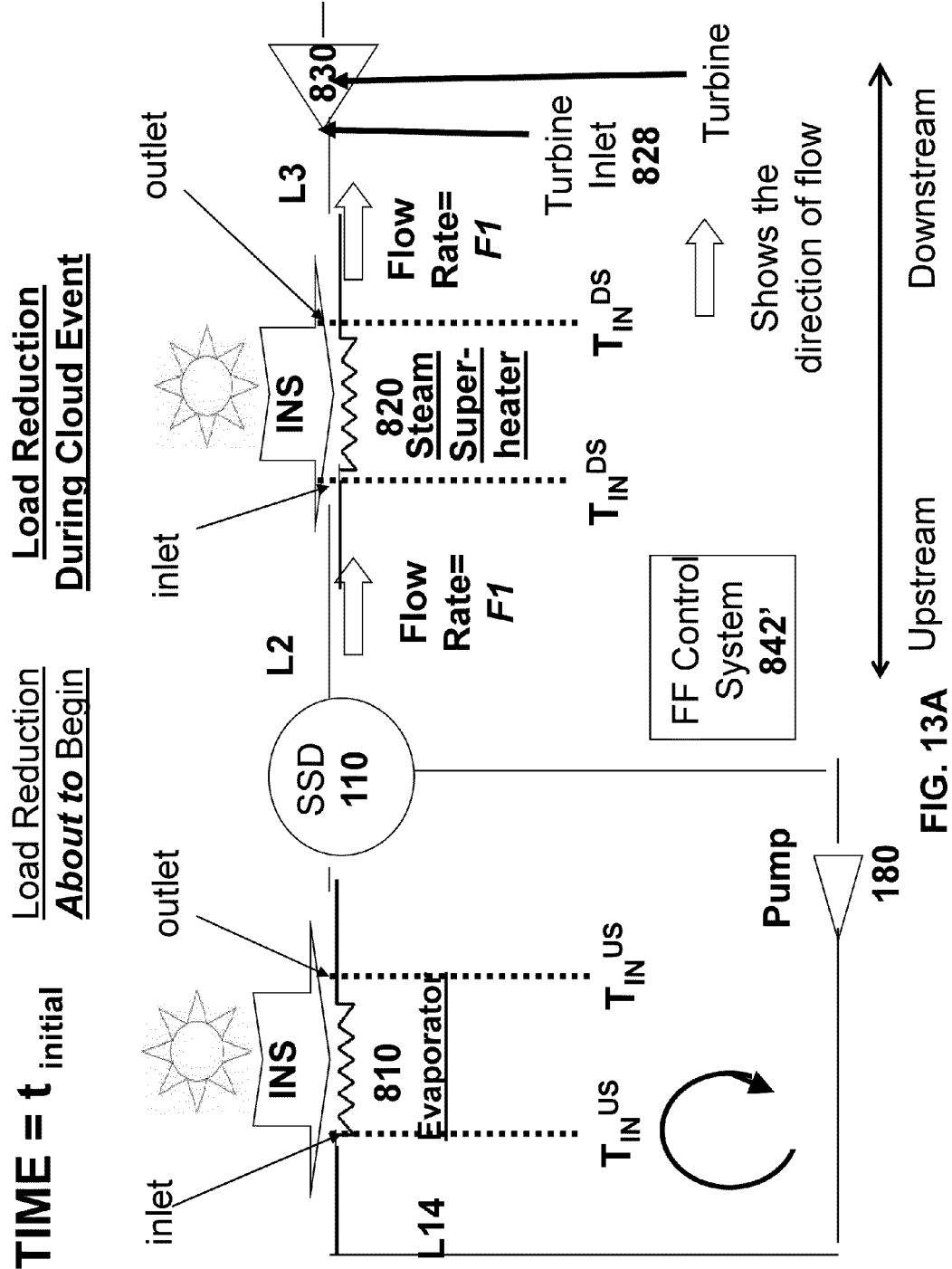
Figure 13B:
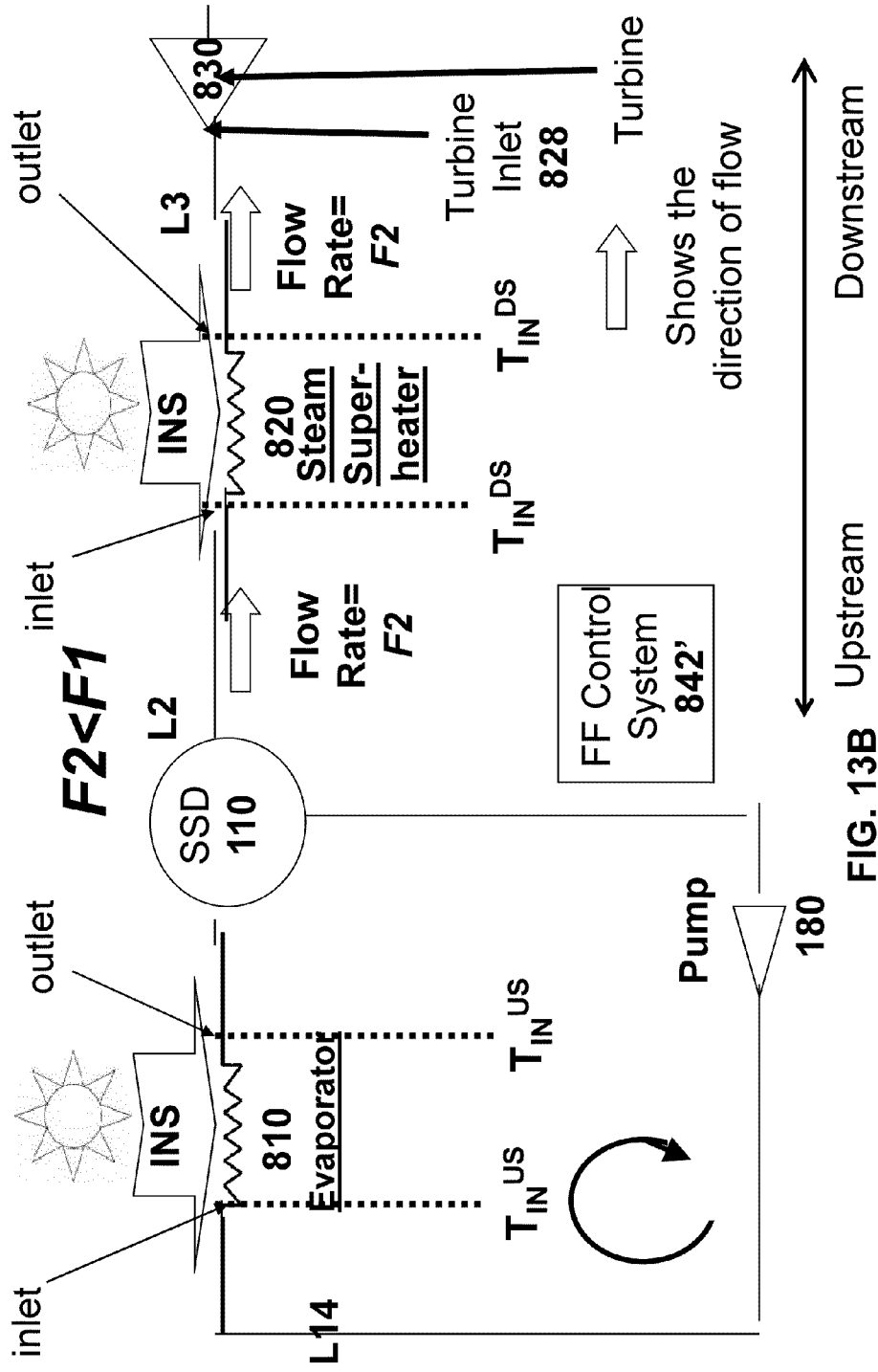

In FIG. 13A, at time $t=t_{initial}$, the flow rate of steam from the first 172 sub-system to the second 174 sub-system is equal to F1. In FIG. 13B, at time $t=t_{later}$, the flow rate of steam from the first 172 sub-system to the second 174 sub-system is reduced to F2. In the case of FIG. 13B (i.e., in the context of step S305 according to some embodiments), the rate of convective heat transfer from the first 172 sub-system to the second 174 sub-system is reduced between times $t_{initial}$ and $t_{later}$.

Alternatively or additionally, it is possible in steps S305 or S311 of FIG. 4 to modify the heliostat aiming policy (e.g., using controller(s) 81) to influence the solar-radiation thermodynamic process. In step S305, it is possible to re-direct heliostats that were previously aimed at the solar evaporator (or supercritical steam generator) 810 to the steam superheater 820 (or steam re-heater). In step S311, it is possible to re-direct heliostats that were previously aimed at the solar evaporator (or supercritical steam generator) 810 to the steam superheater 820 (or steam re-heater).

The re-aiming of heliostats may be carried out in step S305 to reduce the sub-system insolation ratio, i.e., to favor re-directing insolation to the second sub-system 174 (and/or to downstream receiver 820) at the expense of re-directing insolation to the first sub-system 172 (and/or to upstream receiver 810).

In an example, the number of heliostats re-aimed and/or the extent to which sub-system insolation ratio is decreased in step S305 may depend on the predicted intensity and/or predicted duration of the 'reduced insolation event' of step S301. For example, sub-system insolation ratio may be modified in scenarios where the cloud coverage appears to be 'heavy coverage' to a greater extent than scenarios of lighter cloud coverage.

In an example, (i) the amount of enthalpy convectively flowing from the first sub-system 172 to the second sub-system 174 is reduced (i.e., reducing the 'size' of the convective block arrow in FIG. 12—see FIGS. 13A-13B) while (ii) the sub-system insolation ratio describing the allocation of insolation between the first and second sub-systems is decreased. In this example, (i) the amount of convective heat transfer from the first to the second sub-systems is reduced while (ii) concomitantly, heliostats are diverted away from the first sub-system to the second sub-system.

In FIG. 14A, a solar boiler 500 (i.e., any solar receiver including but not limited to a solar evaporator, a solar supercritical steam generator, a solar superheater and a solar reheater) may include a plurality of panels 550 with receiving surfaces (commonly panels of tubing to withstand high pressures) linked in series with each other. As the steam or water flows as illustrated by the block arrows from inlet 504 to outlet 508 towards the turbine 580, the steam or water is heated by insolation so that the temperature upon exiting each panel exceeds the temperature upon entering the panel, i.e., $T_{BC} > T_{AB} > T_{IN}$, etc. Each panel 550 in FIG. 14A may also include one or more drains 522 for releasing steam and/or water.

Figure 14B:
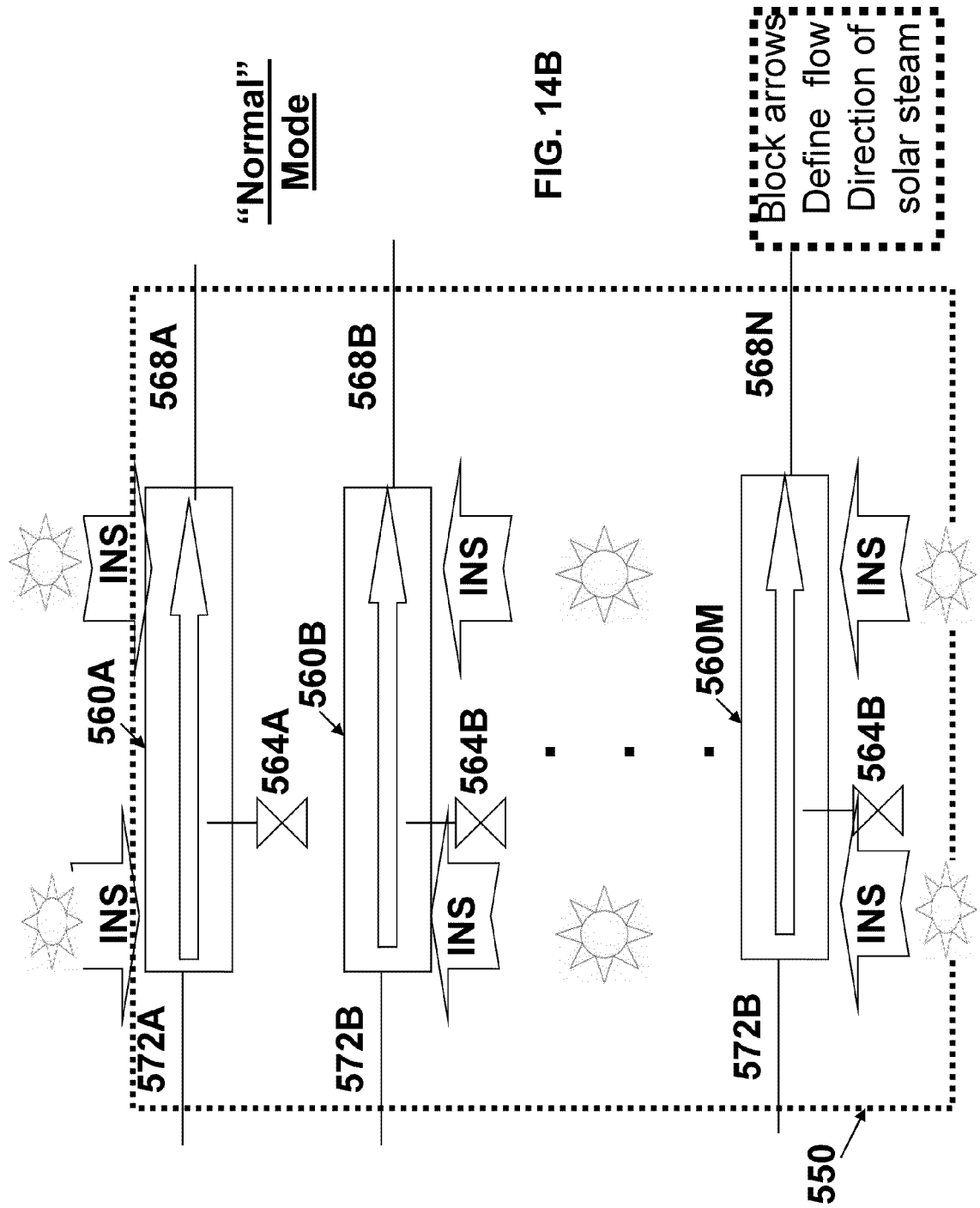

FIG. 14B shows the structure of the plurality of parallel tubes 560 embedded within a single solar heating panel 550. Once again, the water or steam flows in the defined direction so that the outlet temperature exceeds inlet direction (due to insolation). A solar panel can include a plurality of tubes 560 (for example, 10-200 tubes where each tube has a diameter of between about 2 cm and 10 cm).

Figure 15B:
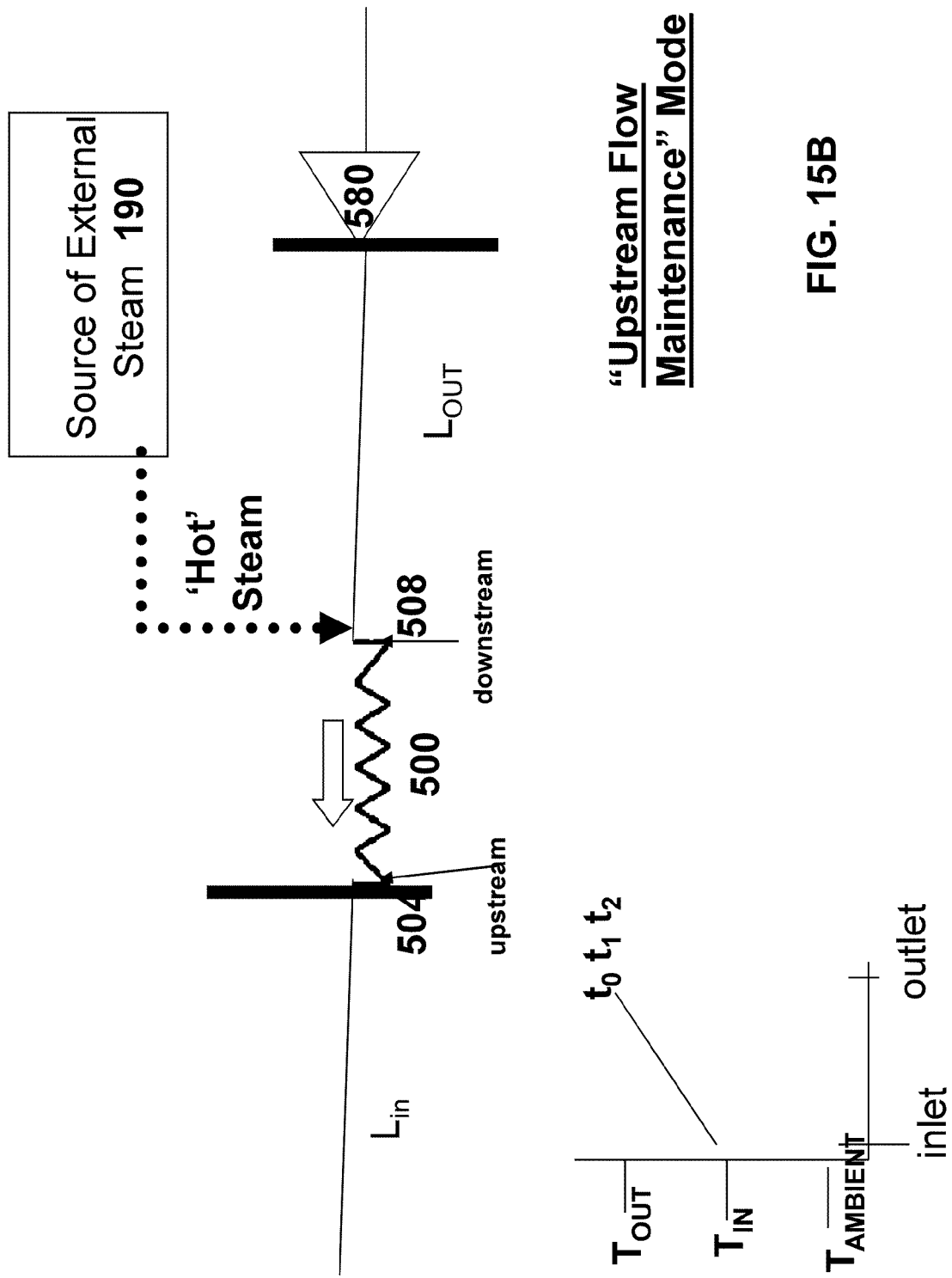
Figure 15C:
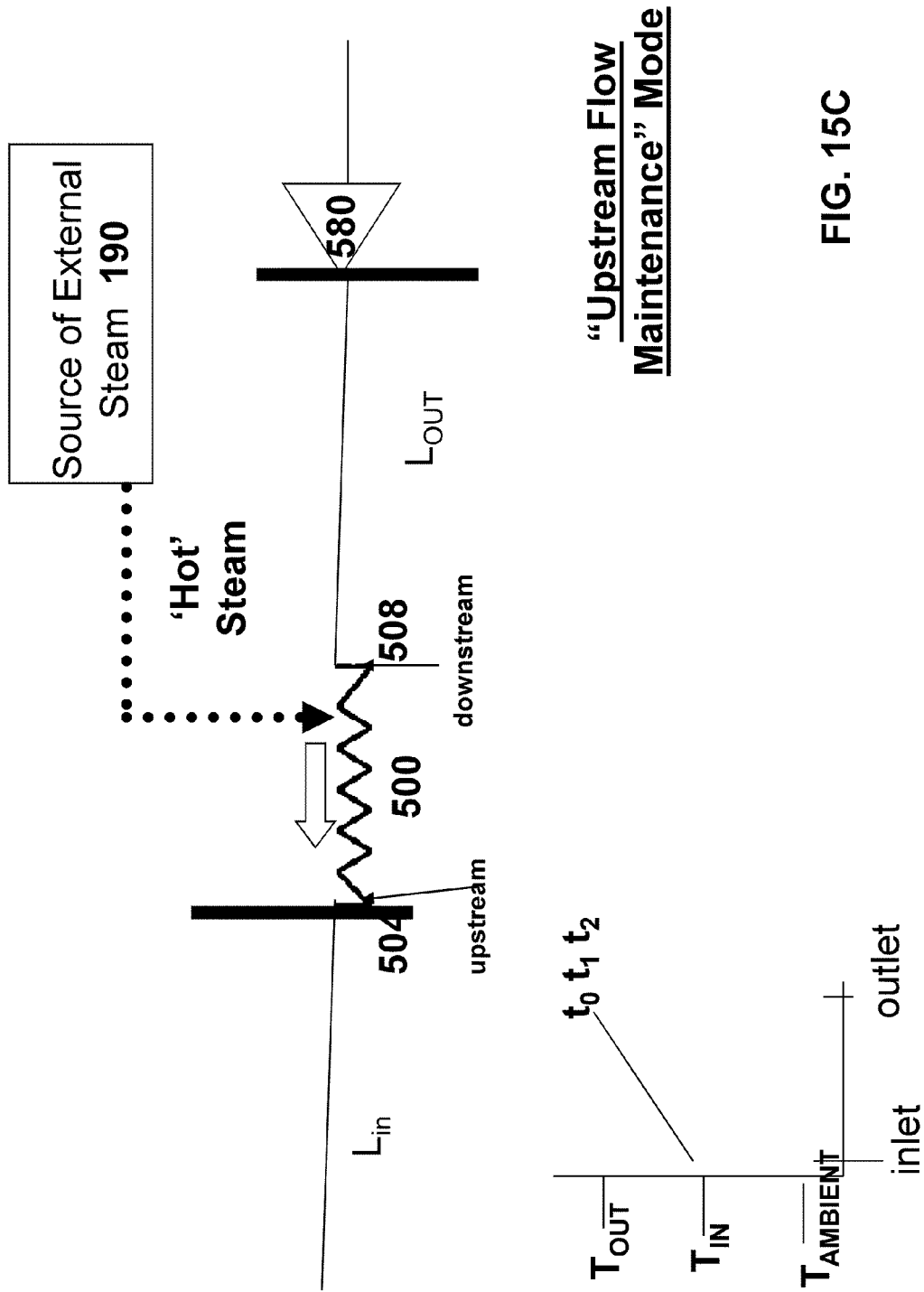
Figure 16A:
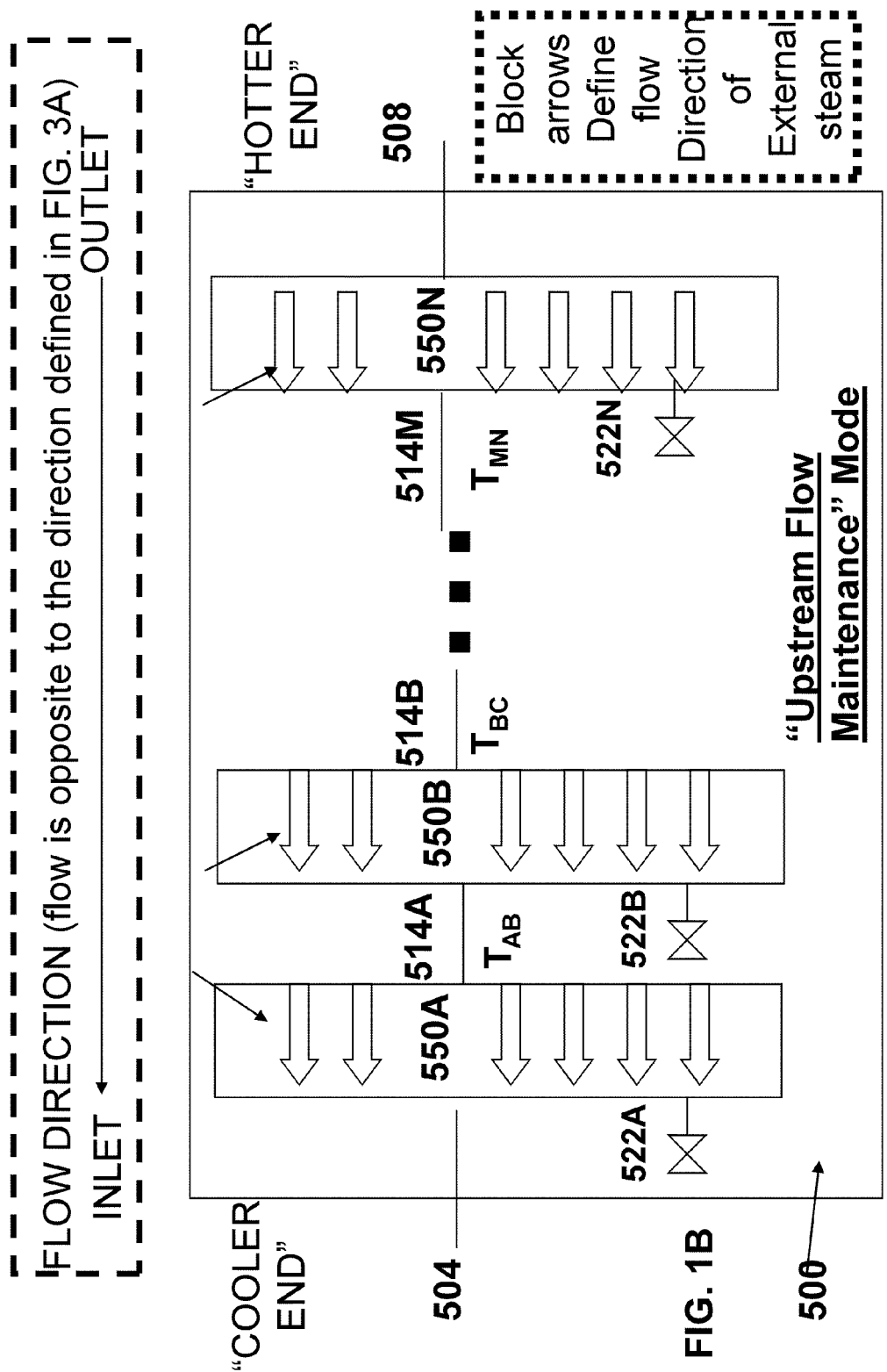
Figure 16B:
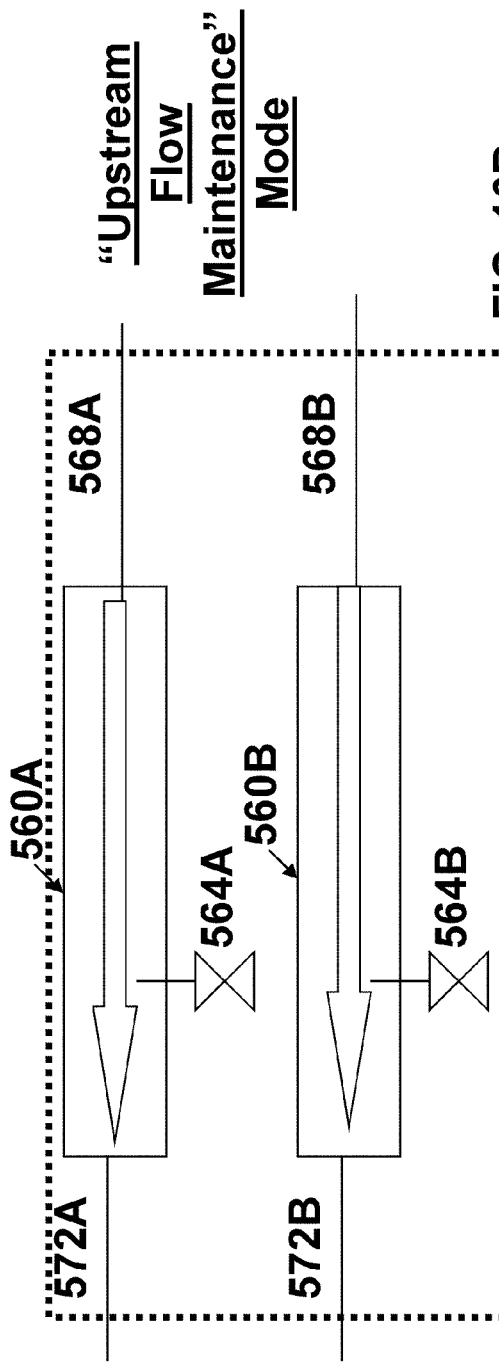

FIGS. 15A-15C illustrates one technique of operating a solar steam system according to one or more embodiments of the disclosed subject matter. In FIG. 15A, when a reduced insolation or complete lack of insolation is predicted or detected, external steam is injected either into the line $L_{out}$ or directly into the outlet 508 of boiler 500 or into boiler 500 at another location.

This steam is caused to flow in the opposite direction of the normal-mode steam flow of FIGS. 2-7—e.g., away from the turbine. By causing steam to flow in the opposite direction, it is possible to eliminate or retard the cooling off of the solar receiver 820 and the steam within (previously described with reference to FIGS. 3A and 3B), and/or of the thermal gradient or temperature profile (previously described with reference to FIG. 2), and specifically to maintain a desired condition wherein a positive temperature gradient is maintained from the inlet 504 to the outlet 508 of the solar boiler system 500.

To this end, the external steam may be provided at a temperature that exceeds $T_{in}$ by a given temperature—for example, by at least 20 or 50 or 70 or 100 or 150 or 200 degrees Celsius. This may be useful for counteracting, preventing, retarding or eliminating the cooling observed in FIGS. 4A-4B, and therefore, at a later time (for example, after the clouds pass) it may be possible to effect a faster resumption of generating electricity from solar steam. Thus, as is observed from FIGS. 15A-15B, the direction of external steam flow within the solar boiler system of FIGS. 15A-15B is opposite the direction of solar steam flow in the 'normal mode' illustrated in FIGS. 3A-3B.

Figure 17A:
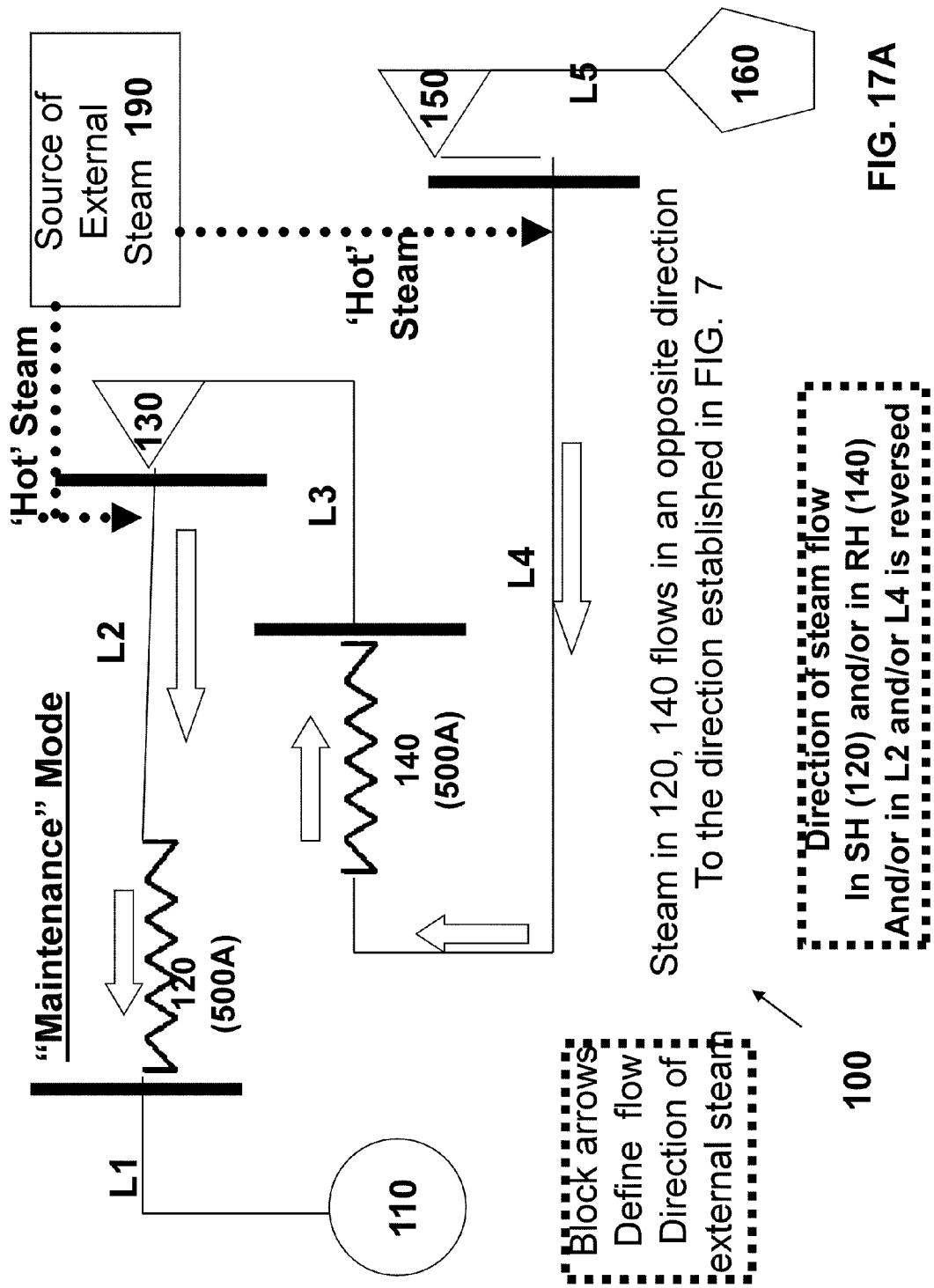
Figure 17B:
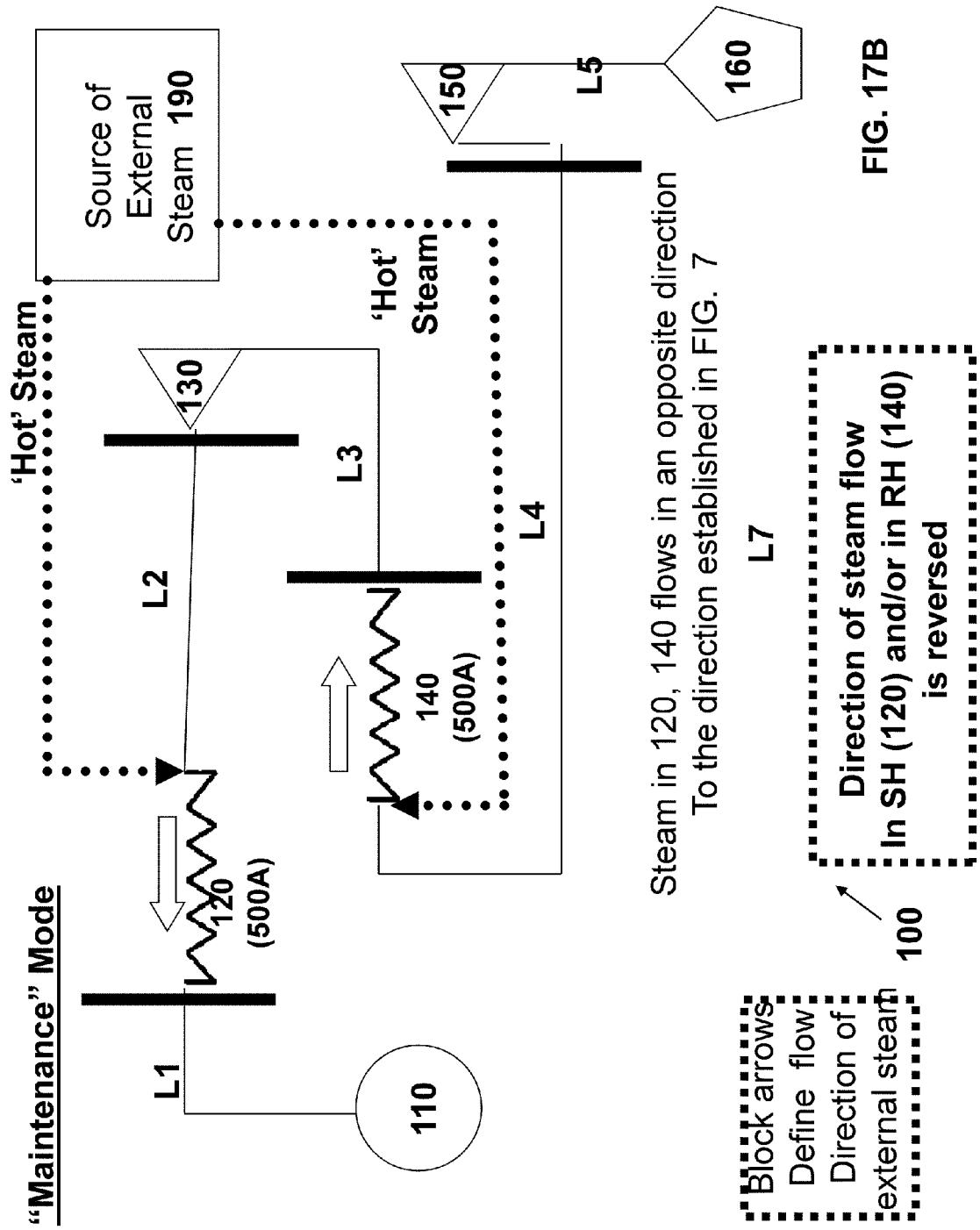

In some embodiments, if the inlet to the solar boiler system 500 is partially or completely sealed as in FIGS. 17A-17C, it may be preferable to open one or more of the drains 522 or 564 when injecting external steam into boiler system 550 from the outlet end and causing this external steam to flow within boiler system 550 towards the inlet 504. This may be useful, for example, for avoiding excessive pressure within boiler system 500.

As is illustrated in FIG. 17A-17B (compare with FIGS. 7A-7B), when there is a temporary reduction in or elimination of insolation (for example, due to clouds, dust, temporary technical problems of some or all of the heliostats or night, or any other reason), it is possible to operate solar steam system 100 in "maintenance mode." When the insolation is reduced or eliminated, solar steam superheater (SH) 120 and/or solar steam reheater (RH) 140 may begin to cool due to the reduced or non-existent insolation. In one non-limiting example, steam delivered at a temperature of 300 degrees Celsius may be (i) heated a temperature that is less than 450 degrees or 400 degrees or 350 degrees Celsius; (ii) not heated at all; or (iii) caused to cool or even condensate.

Under these conditions, it may be not be possible to generate power using one or more turbines because the steam in SH 120 and/or RH 140 is "too cold." Furthermore, if it is desired to once again begin to generate power from insolation at a later time, it may not be possible to do this as quickly as desired. Instead, the SH and/or RH may need to be re-heated to their operating temperatures. This 're-heating' or 'start-up' may take an undesirably large amount of time and/or energy.

In some embodiments, it is possible to reduce this start-up time (i.e., which will be required after the low insolation' conditions conclude and 'high-insolation' conditions once again prevail) by reducing and/or eliminating the rate of cooling within solar steam superheater 120 and/or solar steam reheater 140 during the time of the low-insolation' or 'no-insolation' conditions. This may be useful, for example, for effecting a faster "start up" after the low insolation' conditions conclude and 'high-insolation' conditions once again prevail.

In particular, it may be desired to retard and/or eliminate the cooling (loss of enthalpy primarily by convection and radiation) that takes place during the 'low insolation' or 'no insolation' time periods. Then after the 'low insolation' conditions conclude and 'high-insolation' conditions once again prevail, the amount of "start up' time required to heat steam in SH 120 and/or RH 130 to "operating conditions" required by one or more of the turbines is reduced or eliminated.

Thus, it may be possible, in response to a current or impending reduction in insolation (e.g. due to cloud cover), to carry out one or more of the following steps in "maintenance" and/or "heat maintenance" mode:

A) reduce or stop the production of work by HP 130 and/or LP 150 turbine. In this case, it may be useful to stop or reduce steam flow into one or more of the turbines (indicated in FIG. 3 by the vertical line at the turbine inlets); and/or B) reduce or eliminate the flow of steam from steam separation drum 110 to solar steam superheater 120 via line L1, which may be useful for reducing the rate of cooling within superheater 120 since the average temperature in superheater 120 typically exceeds the temperature of inlet steam received from steam separation drum 110 via line L1; and/or C) reduce or eliminate the flow of steam (or liquid) into solar reheater 140, which may be useful for reducing the rate of cooling within reheater 140 since the average temperature in reheater 140 typically exceeds the temperature of inlet steam received from HP turbine 130 via line L3; and/or D) introduce 'external hot' steam (for example, generated by an 'external' boiler 190, such as a gas-fired boiler or coal-fired boiler or electric boiler) into the line L2 connecting the solar steam superheater 120 to the high pressure turbine 130, in which case the flow of the external steam (once again, flow direction is illustrated by the block arrows) is in the "opposite" direction—i.e., in the upstream direction away from HP turbine 130 and towards superheater (or entering superheater 120 at the outlet thereof). In an example, the introduced hot steam is at least 50 degrees or 100 degrees or 150 degrees warmer than the steam in line L1 or the steam at the inlet of superheater 120 during normal solar operation. In an example, the 'external host steam' that is injected into line L2 has a temperature that is about 480 degrees Celsius, and the steam in line L1 has a temperature of about 300 degrees Celsius; and/or E) introduce 'external hot' steam (for example, generated by an 'external' boiler 190, such as a gas-fired boiler or coal-fired boiler or electric boiler) into the line L4 connecting the solar steam reheater 140 to the low pressure turbine 150, in which case, the flow of the external steam (once again, flow direction is illustrated by the block arrows) is in the "opposite" direction—i.e., in the upstream direction, away from LP turbine 150 and towards reheater (or entering reheater 140 from the 'downstream' side). In an example, the introduced hot steam is at least 50 degrees or 100 degrees or 150 degrees warmer than the steam in line L3 during 'normal' operation (e.g., in FIG. 2) into SH.

Figure 18:
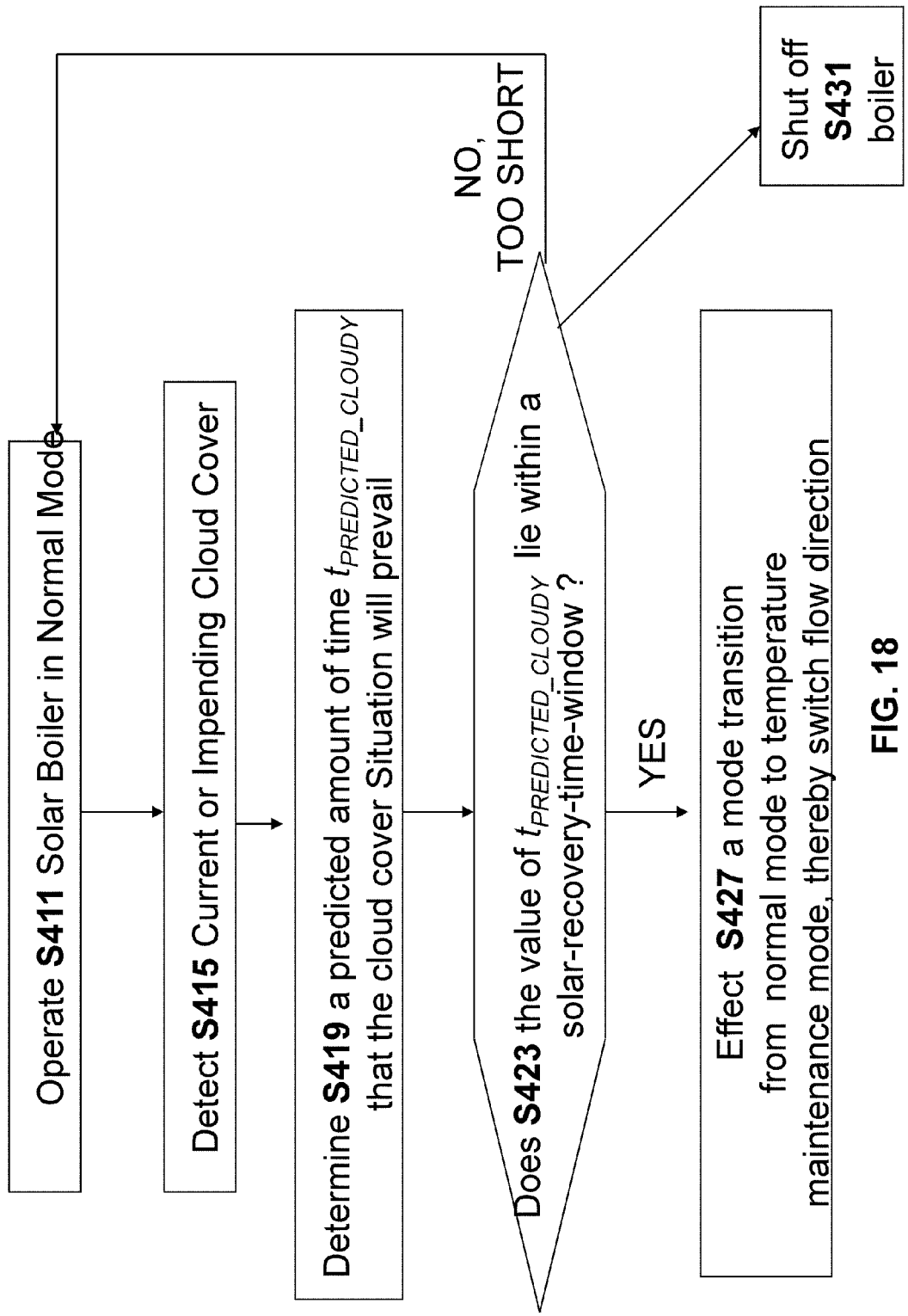
FIG. 18 is a flow chart of a routine for operating a solar receiver.

FIG. 18 is a flow chart of a routine for operating a solar receiver (for example, a superheater or re-heater). In step S411, solar boiler is operated in 'normal solar mode' (see, for example, FIGS. 2-7). In FIG. 17, (i) superheated steam flows via line L2 in a 'downstream direction' to HP turbine 130 which receives the superheated steam to generate electricity and/or (ii) reheated steam flows via line L4 in a downstream direction' to LP turbine 150 which receives the reheated steam to generate electricity In step S415, current or impending cloud cover (or dust or any other factor that could reduce insolation at SH 120 and/or RH 140) is detected. In step S419, an amount of time that the cloud cover will last (or that any reduced or no insolation condition at SH 120 and/or RH 140 will prevail) is determined. In the event that the clouds are estimated to be "briefly passing clouds" and/or the estimated period of time that the estimated to be "short" or "very short," it may be advantageous to continue in "normal mode" and to not inject 'external' steam and to not switch the direction steam flow (for example, the flow direction switch in solar boiler 500 or 120 or 140 or in Lin or Lout in FIG. 2/3A,3B or in L2 and/or in L4). This is because the benefit gained by reducing the rate of temperature drop within SH 120 and/or RH 140 may be outweighed by the 'cost' associated with firing up boiler 190/

Similarly, if it is estimated that the time of low or non-existent insolation is estimated to be 'very long' (for example, cloud cover is expected for the remainder of the day), it may also be preferable to not transfer to 'maintenance mode' since the cost of operating for this "long period of time" 'in maintenance mode may outweigh any benefit enjoyed by reducing the 'start-up' time for commencing generation of solar steam power in one or more steam turbine(s) 130 and/or 150 after the "low insolation" or "no insolation" period.

However, if the predicted amount of time $t_{predicted\_cloudy}$ is within a "solar-recovery-time-window" (i.e., such that the thermodynamic or other advantage enjoyed by reducing the 'start-up' time exceeds any disadvantage or cost associated with flowing steam (for example, natural-gas generated steam) 'upstream' in L2 and/or L4), then it may be advantageous to 'transition' from normal mode to 'upstream external steam flow maintenance mode.' In a non-limiting example, if it is predicted that the cloud cover will last 1-3 hours, then it may be advantageous to effect one or more techniques disclosed herein to reduce the rate of cooling of steam within SH 120 and/or RH 140 during the 'low' or 'no insolation' time period.

It is noted that the value of $t_{predicted\_cloudy}$ may be only one factor used to determine whether or not to transition to maintenance mode. For example, if cloud cover is predicted for the end of the day right before sunset, it may not be advantageous to effect the mode transition even if the amount of time predicted for the cloud cover is within the appropriate solar-recovery-time-window.

Thus, in step S423, if the amount of time is not within the time window, but is too short, the system may continue operating in normal mode. If the amount of time is expected to be very "long," it may be advantageous to effect a shut-down (step S451). Otherwise, in step S427, the transition is effected to maintenance mode.

Methods for operating a solar boiler can include, among other things: (a) when insolation is available: (i) using the insolation to superheat steam within a solar superheater; (ii) sending the superheated steam in from the solar superheater to a first steam turbine via a first steam line (e.g., L2); (iii) generating work from the superheated steam using the first steam turbine; and (b) in response to an actual and/or pre-dicted reduction or elimination of solar insolation: (i) reducing or eliminating the superheating of steam within the solar superheater; (ii) introducing external steam into the first steam line, the external steam having a temperature that exceeds an inlet steam temperature of the solar superheater in (a); (iii) sending the external steam via the first steam line to the solar superheater in a flow direction that is opposite to the flow direction of the sending of (a)(ii).

In some embodiments, (a) can further include (iv) re-heating steam that exits the first turbine using a solar reheater; (v) sending the reheated steam in from the solar reheater to a second steam turbine via a second steam line (e.g., L4); (vi) generating work from the reheated steam using the second steam turbine; and (b) can further include: (iv) reducing or eliminating the reheating of steam within the superheater; (v) introducing external steam into the second steam line, the external steam having a temperature that exceeds an inlet steam temperature of the solar re-heater in (a); (vi) sending the external steam introduced in (b)(v) via the second steam line to the solar re-heater in a flow direction that is opposite to the flow direction of the sending of (a)(v).

In some embodiments, the first turbine is a high-pressure turbine and the second turbine is a low-pressure turbine.

In some embodiments, one or more of the teachings described herein is useful for at least one of: increasing solar energy generation efficiency during days of intermittent cloudy periods, maximizing electricity production and/or revenue generation of a solar electric facility, and meeting reliability requirements of an electric transmission network operator.

Embodiments of the present disclosure have been explained in the context of heliostat-based systems and/or central tower systems; however, one or more of the teachings disclosed herein may also be practiced in other systems where concentrated insolation is used to heat water, steam, or other working fluids. For example, teachings of the present disclosure are applicable to so-called a trough-based solar steam systems.

The description, embodiments and figures should not to be taken as limiting the scope of the appended claims. Rather, it should be understood that not every disclosed feature is necessary in every implementation of the invention. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e., meaning "must").

Certain features of the disclosed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is thus apparent that there is provided, in accordance with the present disclosure, methods and systems for operating a solar steam system. Many alternatives, modifications, and variations are enabled by the present disclosure. While specific embodiments have been shown and described in detail to illustrate the application of the principles of the invention, it will be understood that the invention may be embodied otherwise without departing from such principles. Features of the disclosed embodiments may be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A method of operating a solar receiver, the method comprising:
   (a) when insolation is available, causing a fluid through the solar receiver in a first direction so that the fluid is heated within the solar receiver by insolation;
   (b) detecting a current or impending reduced-insolation event; and
   (c) in response to the detected reduced-insolation event, causing external steam to flow within the solar receiver in a second direction that is the opposite of the first direction.

2. The method of claim 1, wherein the fluid is superheated steam.

3. A method of controlling a solar thermal system, the solar thermal system having a plurality of heliostats, a first sub-system, and a second sub-system, the first sub-system including a re-circulating boiler loop where water flows between a solar evaporator and a steam separation drum such that steam generated by the solar evaporator is received into the steam separation drum and liquid-phase water is sent back to the solar evaporator, the second sub-system including a solar superheater and a turbine where steam from the steam separation drum of the first sub-system flows to the turbine via the solar superheater of the second sub-system where it is superheated, the method comprising:
   detecting or predicting a current or impending transient reduced insolation event; and
   responsively to the detecting or predicting, effecting the following:
      regulating fluid flow to reduce a flow of enthalpy from the first sub-system into the second sub-system, thereby conserving enthalpy in the first sub-system; and
      re-aiming heliostats to re-allocate available insolation to increase a fraction of total available insolation directed to the second sub-system at the expense of insolation directed to the first sub-system.

* * * * *